US012573387B1

(12) United States Patent
Ghotbi et al.

(10) Patent No.: US 12,573,387 B1
(45) Date of Patent: Mar. 10, 2026

(54) NATURAL LANGUAGE UNDERSTANDING OF A SPOKEN INPUT RESULTING IN PLURAL DISTINCT IN CATEGORY ACTIONS

(71) Applicant: Amazon Technologies, Inc., Seattle, WA (US)

(72) Inventors: Sina Ghotbi, North Vancouver (CA); Sedigheh Mahdavi, Vancouver (CA); Ruiwei Jiang, Vancouver (CA); Nicholas George Erho, Vancouver (CA); Hossein Bashashati Saghezchi, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 770 days.

(21) Appl. No.: 17/854,620

(22) Filed: Jun. 30, 2022

(51) Int. Cl.
| | |
|---|---|
| *G10L 13/033* | (2013.01) |
| *G06F 16/9535* | (2019.01) |
| *G06F 40/284* | (2020.01) |
| *G06Q 10/1093* | (2023.01) |
| *G10L 13/08* | (2013.01) |
| *G10L 15/02* | (2006.01) |
| *G10L 15/18* | (2013.01) |
| *G10L 15/22* | (2006.01) |
| *H04L 12/28* | (2006.01) |
| *H04M 9/08* | (2006.01) |

(52) U.S. Cl.
CPC ............ *G10L 15/22* (2013.01); *G06F 40/284* (2020.01); *G10L 15/1815* (2013.01); *G06F*

*16/9535* (2019.01); *G06Q 10/1093* (2013.01); *G10L 2015/223* (2013.01); *H04L 12/28* (2013.01)

(58) Field of Classification Search
CPC ... G10L 15/22; G06F 40/284; G06F 16/9535; G06Q 10/1095; H04L 12/2829
USPC ........................................................ 704/231
See application file for complete search history.

(56) References Cited

U.S. PATENT DOCUMENTS

| | | | | |
|---|---|---|---|---|
| 2019/0295042 A1* | 9/2019 | Lazar, Jr. | ........... | G06Q 10/1095 |
| 2021/0233534 A1* | 7/2021 | Nadig | ................... | G06F 40/284 |
| 2021/0342740 A1* | 11/2021 | Xu | ....................... | G06F 16/9535 |
| 2022/0407738 A1* | 12/2022 | Rakshit | ............... | H04L 12/2829 |

* cited by examiner

*Primary Examiner* — Farzad Kazeminezhad
(74) *Attorney, Agent, or Firm* — Pierce Atwood LLP

(57) ABSTRACT

Techniques for determining semantic information for a user input are described, where the semantic information is in addition to an explicit request included in the user input. Some embodiments involve using an implicit information component to determine additional information, which can be used by a skill component to perform additional actions with respect to the user input. In an example embodiment, the implicit information component determines that an event included in a user input corresponds to an important event. In addition to an action requested in the user input, a skill component causes performance of an additional action with respect to the event (e.g., generate a follow-up reminder for the event).

18 Claims, 10 Drawing Sheets

Figure 3B:
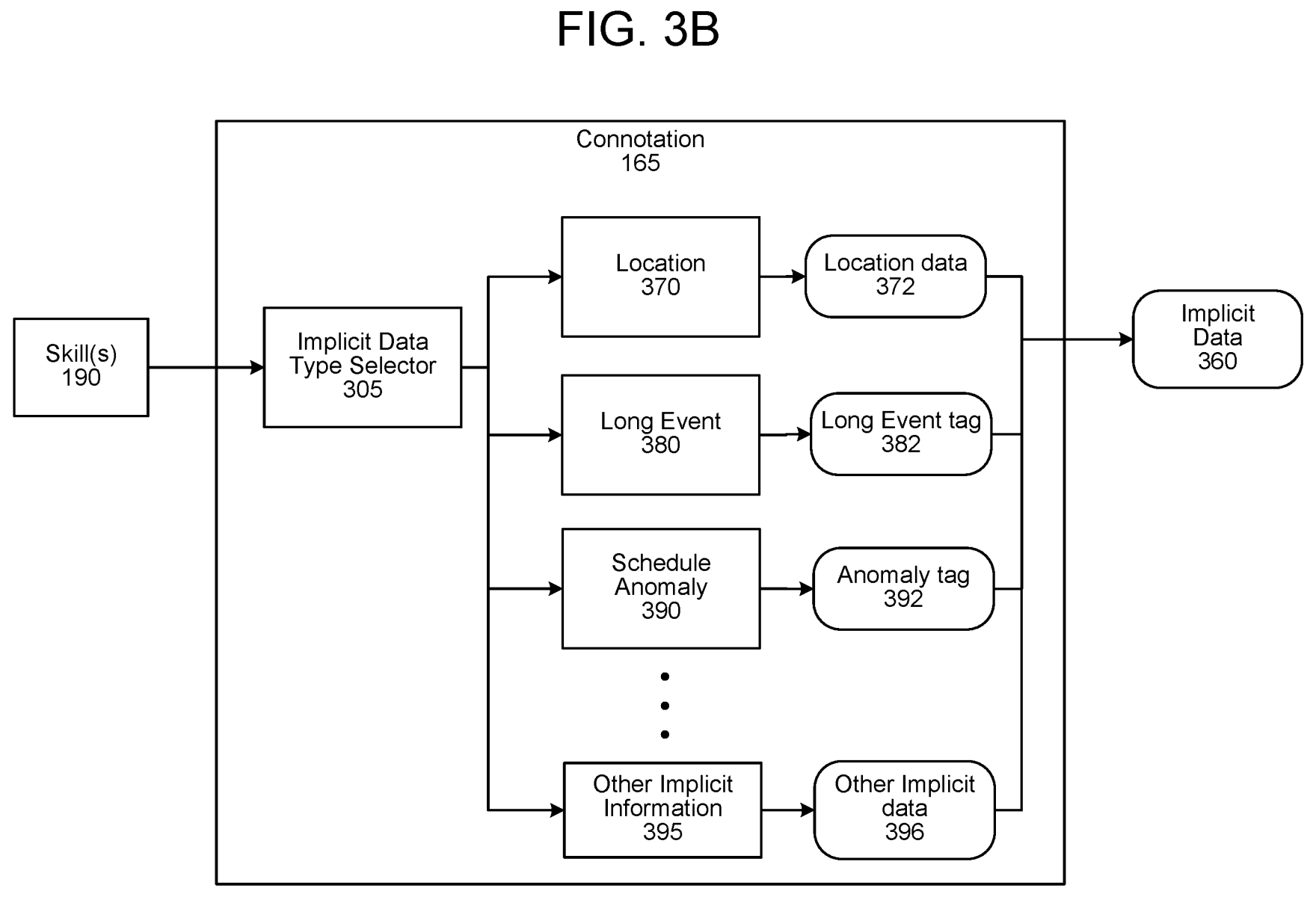

Implicit Data 360

Connotation 165

Location data 372

Long Event tag 382

Anomaly tag 392

Other Implicit data 396

Location 370

Long Event 380

Schedule Anomaly 390

• • • •

Other Implicit Information 395

Implicit Data Type Selector 305

Skill(s) 190

FIG. 4

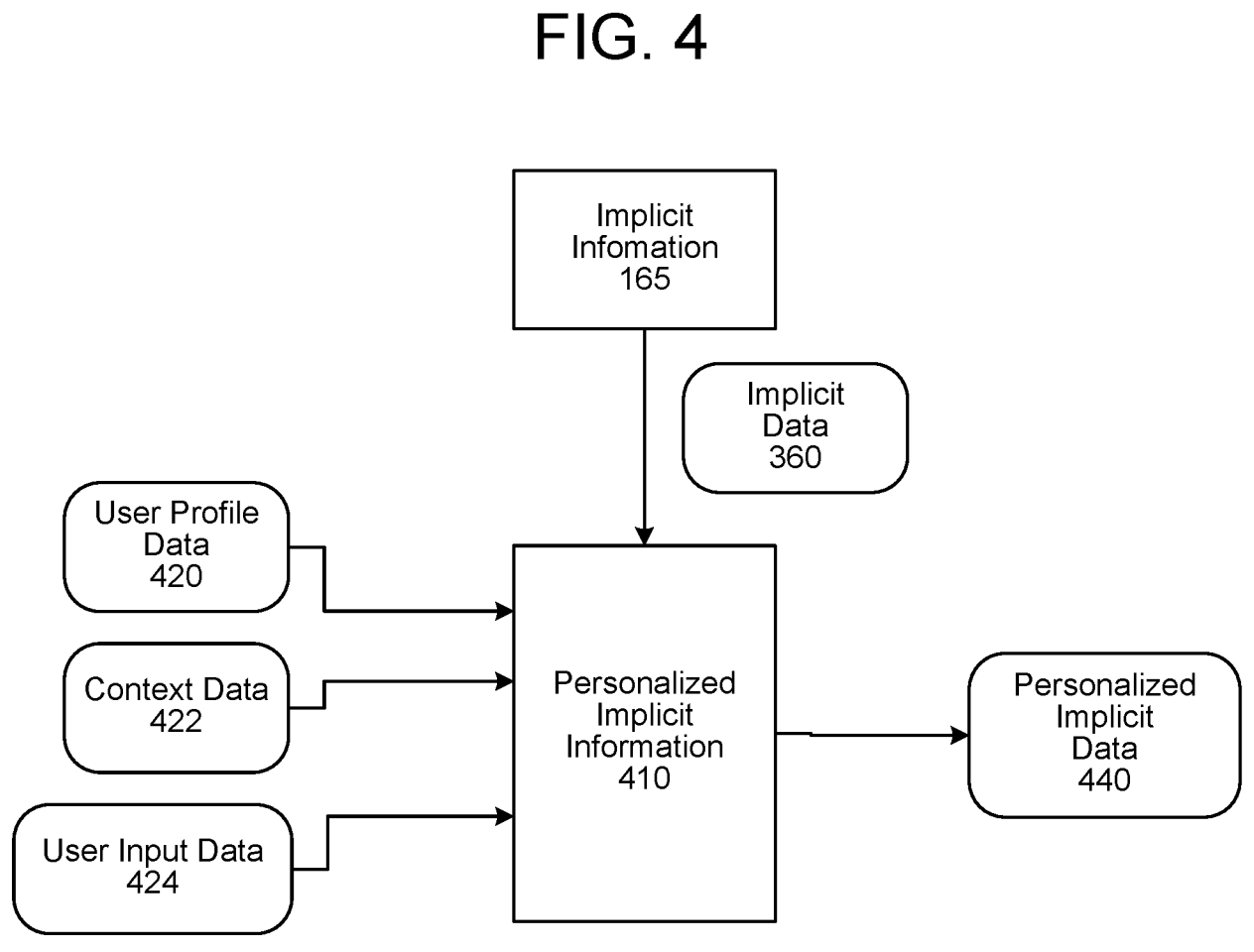

Implicit Information 165

Implicit Data 360

Personalized Implicit Information 410

Personalized Implicit Data 440

User Profile Data 420

Context Data 422

User Input Data 424

System(s) 120/121/125

Bus 824

Network(s) 199

I/O Device Interfaces 802

Controller(s) / Processor(s) 804

Memory 806

Storage 808

NATURAL LANGUAGE UNDERSTANDING OF A SPOKEN INPUT RESULTING IN PLURAL DISTINCT IN CATEGORY ACTIONS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating an example system for a reminder skill to use implicit data, according to embodiments of the present disclosure.

FIG. 2 is a conceptual diagram illustrating an example system for a calendar skill to use implicit data, according to embodiments of the present disclosure.

FIGS. 3A-3B illustrate example components of an implicit information component, according to embodiments of the present disclosure.

FIG. 4 is a conceptual diagram illustrating a personalized implicit information component, according to embodiments of the present disclosure.

FIG. 7 is a block diagram conceptually illustrating example components of a device, according to embodiments of the present disclosure.

FIG. 8 is a block diagram conceptually illustrating example components of a system, according to embodiments of the present disclosure.

DETAILED DESCRIPTION

Figure 3A:
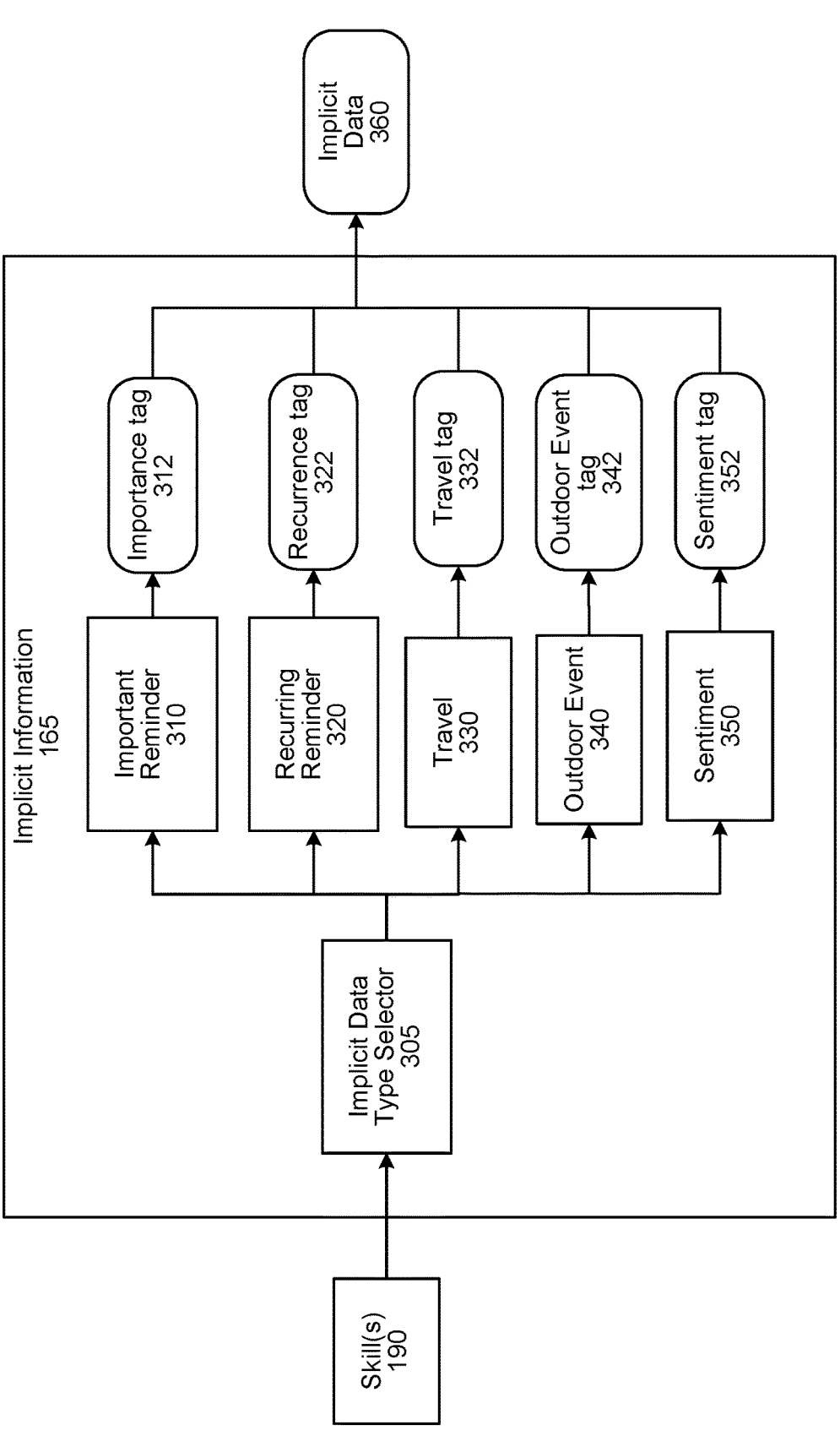

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from an input containing natural language. ASR and NLU are often used together as part of a speech processing system. Spoken language understanding (SLU) involves determining meaning (e.g., intent, entities, etc.) directly from audio including speech. Text-to-speech (TTS) is a process for transforming textual data into audio data that is synthesized to resemble human speech. Natural language generation (NLG) can also be used to generate human-understandable outputs representing machine representations of information. The NLG outputs can be shared with human users as synthesized speech (generated using TTS), displayed text, or other ways of communicating natural language content to a user.

Certain systems may be configured to perform actions responsive to user inputs. For example, for the user input of "Alexa, play music by [artist]," a system may output music sung by the indicated artist. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A system may receive a user input as speech. For example, a user may speak an input to a device. The device may send audio data, representing the spoken input, to the system. The system may perform ASR processing on the audio data to generate data (e.g., ASR data, token data or text data) representing the words spoken by the user. The system may perform NLU processing on the ASR data (text data or other type of data for a user input that is not speech) to determine an intent of the user input as well as portions of the input that may be used to perform a requested action. Alternatively, the device, itself, may perform one or both of the ASR and NLU processing.

NLU processing involves determining a meaning (e.g., a semantic meaning or information) that is explicitly expressed in the user input. For example, the user input "Set up a reminder to pay rent on Monday" may cause NLU processing to determine an intent to "add a reminder" titled "pay rent" for "Monday", where such information is determined from the explicit words in the user input. As another example, the user input "Add John's soccer game to my calendar for Saturday 2 p.m." may cause NLU processing to determine an intent to "add a calendar event" titled "John's soccer game" for "Saturday" at "2 p.m." NLU processing can also involve inferring certain information that may not be explicitly expressed in the user input. For example, the user input "Add a reminder for that" does not explicitly state an event, however, the system can infer the event based on a prior dialog exchange between the user and the system, based on information that may have been recently presented to the user via a device, etc.

The present disclosure relates to techniques for determining additional semantic information for a natural language user input, where the additional semantic information can be used to determine other actions that the system can perform and are relevant to the expressly requested action in the user input. The additional semantic information may be referred to herein as "implicit" information or data that corresponds to an action, inferred from the user input, and that is in addition to the explicitly requested action. The implicit data can be used by the system to perform one or more additional actions in response to the user input. As an example, for the user input "Remind me about [event]", the explicit requested action is a reminder for the [event], and the improved techniques of the present disclosure can determine implicit data indicating that the [event] is an important event. Using such implicit data (indicating that the [event] is important), the system can perform an additional action of generating a follow-up reminder for the [event].

An implicit information component processes data corresponding to the user input, such as ASR data, NLU data, etc., to determine the implicit information. The implicit information is then provided to a skill component to determine additional actions that can be performed with respect to the user input. For example, for the user input "Remind me to [action]", the implicit information component can determine whether the indicated action is an important action where the user can benefit from receiving follow-up reminders. The implicit information component sends, to the skill component (e.g., a reminder skill component), data indicating that the requested reminder is an important reminder, and the skill component may then ask the user whether follow-up reminders should be set for the requested reminder.

As another example, for the user input "Add [event] to calendar," the implicit information component can determine whether the indicated event is an indoor event or an outdoor event. The implicit information component can also determine whether the user will have to travel for the indicated event. The implicit information component sends the determined implicit information to a skill component (e.g., a calendar skill component), which can cause performance of one or more additional actions. For example, for an outdoor event, the skill component may present weather information to the user prior to the event so that the user may prepare accordingly. As another example, for an event that requires travel, the skill component may present and/or cause another skill to present traffic information.

In some embodiments, the implicit information component employs different techniques to determine different implicit information. Such techniques may involve use of a machine learning (ML) model, statistical model, rules-based engine, etc. For example, the implicit information component may use a first technique to determine whether a reminder is an important reminder or not, a second technique to determine whether an event is an outdoor event or an indoor event, a third technique to determine whether an event requires travel, and the like.

In some embodiments, a skill component requests implicit information from the implicit information component. Based on the particular skill component, the particular request, and/or the action requested in the user input, the implicit information component may determine a type of implicit information to provide, and may execute the corresponding technique to determine the type of implicit information. For example, if a reminder skill component requests implicit information, then the implicit information component may execute a first technique to determine whether the reminder requested in a user input is important or not. As another example, if a calendar skill component requests implicit information, then the implicit information component may execute a second technique to determine whether the event is an outdoor event or an indoor event.

The implicit information component can determine other implicit information, as described herein, to enable a skill component(s) to determine one or more other actions that are relevant to a requested action. Thus, in addition to the meaning explicitly expressed in a user input, the implicit information component can infer additional semantic meanings from the user input to enhance a user's experience.

Teachings of the present disclosure provide, among other things, improvements to a user experience by predicting other tasks that are relevant (or may otherwise be beneficial) to the user in addition to the specifically requested task. Teachings of the present disclosure also improve functioning of a virtual assistant system by enabling the virtual assistant system to offer other relevant or beneficial tasks, thus enhancing user interactions (e.g., the user receives follow-up reminders for important actions, the user can receive weather information for outdoor events, the user can receive traffic information for an event that requires travel, etc.).

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

Figure 1:
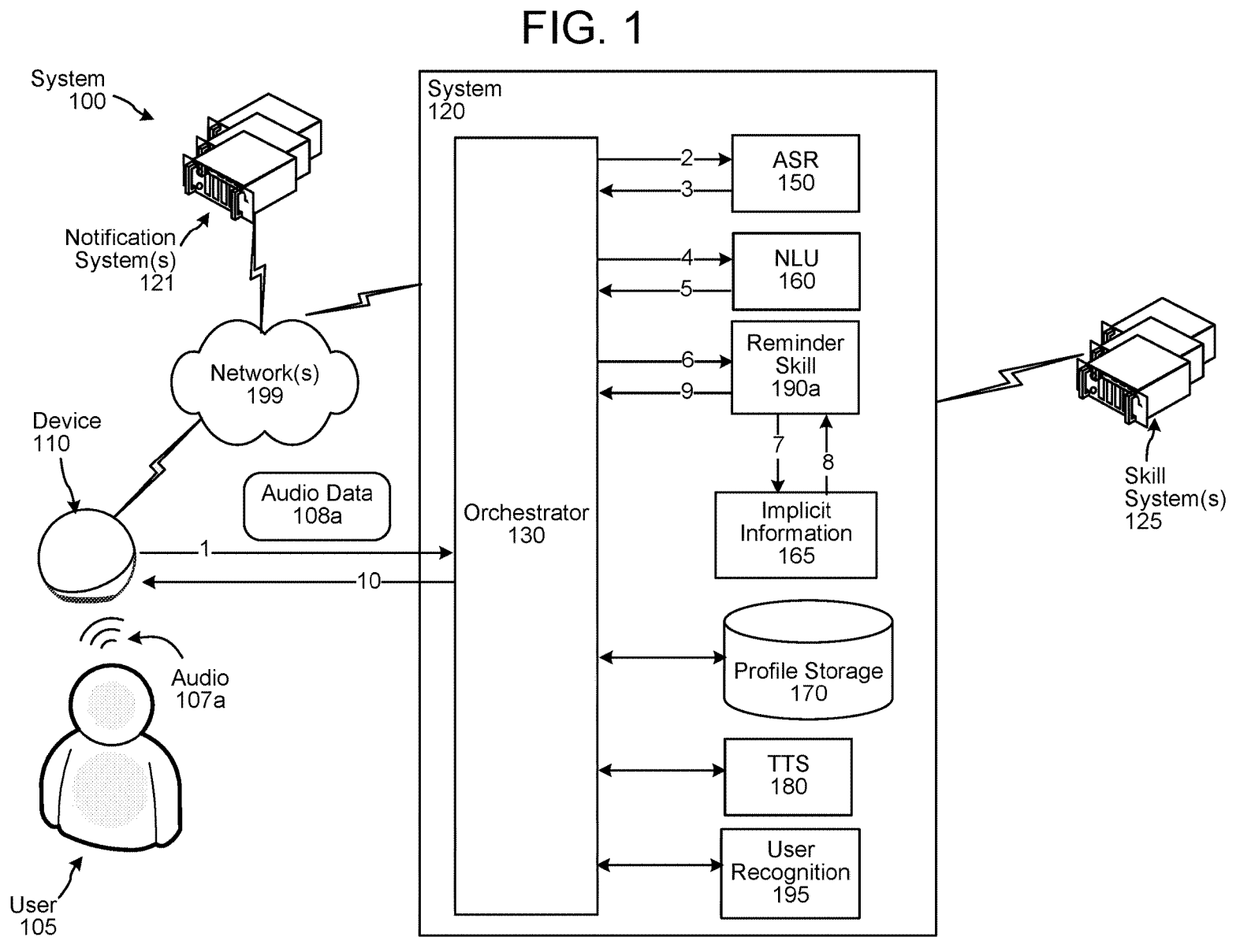

FIG. 1 is a conceptual diagram illustrating an example system 100 for a reminder skill component to use implicit data. As shown in FIG. 1, the system 100 may include a device 110, local to a user 105, connected to a system 120 across one or more networks 199. The system 100 may also include a notification system(s) 121 connected to the system 120 and/or the device 110 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may include multiple components to facilitate speech processing, such as, an orchestrator component 130, an ASR component 150, and an NLU component 160. The system 120 may further include one or more skill components 190, for example, a reminder skill component 190a, which may be in communication with a skill system(s) 125 external to the system 120. The system 120 may also include implicit information component 165 configured to determine additional semantic information corresponding to a user input. The system 120 may also include, as described later herein, a profile storage 170, a TTS component 180, and a user recognition component 195 to facilitate processing of user inputs and generating outputs.

One or more skill components 190 may communicate with one or more skill systems 125. A "skill" may refer to software, that may be executed on a machine or a virtual machine (e.g., software that may be launched in a virtual instance when called), configured to perform one or more actions in response to user inputs processed by the NLU component.

Referring to FIG. 1, the user 105 may speak an input, and the device 110 may capture audio 107a representing the spoken user input. For example, the user 105 may say "Remind me to pay rent on the first" or "Set a reminder for John's birthday." The device 110 may send (step 1) audio data 108a, corresponding to the audio 107a, to the system 120 for processing.

In other examples, the user 105 may provide another type of input (e.g., textual input, selection of a button, selection of one or more displayed graphical interface elements, performance of a gesture, etc.). The device 110 may send other types of input data, such as image data, text data, etc. to the system 120. In some examples, the device 110 may send more than one type of input data, depending on the type of input(s) provided by the user 105, to the system 120 for processing.

The orchestrator component 130 may receive the audio data 108a (or other type of input data) from the device 110. The orchestrator component 130 may be configured to send data to and receive data from various components of the system 120 to facilitate processing with respect to the (spoken) user input. In the example of FIG. 1, the orchestrator component 130 may send (step 2) the audio data 108a to the ASR component 150. In other examples, the orchestrator component 130 may send the other types of input data to different components, for example, image data to an image processing component, text data to the NLU component 160, gesture input data to a gesture detection component, etc.

The ASR component 150 transcribes the audio data 108a into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data with models for sounds (e.g., subword units, such as phonemes, etc.) and sequences of sounds to identify words that match the sequence of sounds of the speech represented in the audio data.

The ASR component 150 may send (step 3) the ASR data to the orchestrator component 130. For example, the ASR component 150 may send ASR data representing that the user input is "Remind me to pay rent on the first." As a further example, the ASR component 150 may send ASR data representing that the user input is "Set a reminder for John's birthday."

In at least some instances, instead of the device 110 receiving a spoken natural language input, the device 110 may receive a textual (e.g., typed) natural language input. The device 110 may determine text data representing the textual natural language input, and may send the text data to the system 120, wherein the text data is received by the orchestrator component 130.

The orchestrator component 130 may send (step 4) the ASR data (or text data depending on the type of natural language input received) to the NLU component 160. The NLU component 160 may process the ASR data to determine NLU data (e.g., intent data, entity data, domain data, one or more NLU hypotheses including an intent, one or more entities, and corresponding confidence score.) corresponding to the user input provided by the user 105.

The NLU component 160 may perform intent classification (IC) processing on the ASR data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data that the NLU component believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}:

"the rolling stones." The NER processing may identify "Play" as a verb based on a word database associated with the music skill, which IC processing determines corresponds to a <PlayMusic> intent.

The NLU component 160 may generate NLU data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU data may include multiple NLU hypotheses, with each NLU hypothesis corresponding to IC processing and NER processing performed on the ASR data or text data with respect to a different skill.

The NLU component 160 may send (step 5) the NLU data to the orchestrator component 130. For example, for the user input "Remind me to pay rent on the first," the NLU component 160 may send NLU data including intent: {RemindIntent}, entity type: "action", entity value: "pay rent", entity type: "date" entity value: "first", and may optionally include a skill identifier for a reminder skill component 190*a*. As a further example, for the user input "Set a reminder for John's birthday", the NLU component 160 may send NLU data including intent: {RemindIntent}, entity type: "action", entity value: "John's birthday", and may optionally include a skill identifier for the reminder skill component 190*a*.

The orchestrator component 130 may invoke the reminder skill component 190*a* based on the NLU data indicating the reminder skill component 190*a*. In other embodiments, the system 120 may determine that the reminder skill component 190*a* is to be invoked based on the intent data and/or the entity data included in the NLU data, and/or other data (e.g., user profile data, recently used skills, skills currently in use, etc.). The orchestrator component 130 may send (step 6) the NLU data to the reminder skill component 190*a*.

The reminder skill component 190*a* may determine output data responsive to the user input based on processing the NLU data. The output data may represent an action to be performed in response to the user input. For example, the action may be storing reminder data to set a reminder according to the user input. The output data may include a natural language output to be presented (e.g., by displaying corresponding text and/or by outputting corresponding synthesized speech) to the user 105. The natural language output, for example, may indicate to the user 105 that the requested reminder has been set.

The reminder skill component 190*a* may invoke the implicit information component 165 by sending (step 7) a request for implicit data corresponding to the user input. In some embodiments, the request, from the reminder skill component 190*a*, may include the NLU data corresponding to the user input. In some embodiments, the implicit information component 165 may also or alternatively receive the ASR data corresponding to the user input (e.g., from the ASR component 150, from the orchestrator component 130, etc.).

In some embodiments, the reminder skill component 190*a* may determine for which user inputs to request implicit data. For example, if the user 105 requests a follow-up reminder for an event (e.g., via the user input received in step 1, or via another user input), then the reminder skill component 190*a* may not request implicit data for the user input. As another example, if the user 105 requests a recurring reminder for an event, then the reminder skill component 190*a* may not request implicit data for the user input.

The implicit information component 165 may process the NLU data (and/or the ASR data, other data, etc.) to determine implicit data corresponding to additional semantic information corresponding to the user input, where such information can be used to determine one or more additional relevant actions corresponding to the user input. Based on receiving the request from the reminder skill component 190*a*, in some embodiments, the implicit information component 165 may determine whether the reminder requested by the user 105 is an important reminder (warranting a follow-up reminder) or an unimportant reminder. Details on how the implicit information component 165 determines whether a reminder is important or unimportant are described below in relation to FIG. 3A.

The implicit information component 165 may send (step 8), to the reminder skill component 190*a*, the implicit data corresponding to the user input, where in some example embodiments, the implicit data may indicate whether the user input corresponds to an important reminder or the user input corresponds to an unimportant reminder. For example, for the user input "Remind me to pay rent on the first," the implicit information component 165 may send implicit data representing that the user input corresponds to an important reminder. As a further example, for the user input "Set a reminder for John's birthday", the implicit information component 165 may send implicit data representing that the user input corresponds to an unimportant reminder.

The reminder skill component 190*a* may process the implicit data to determine additional output data corresponding to the user input. The additional output data may correspond to one or more additional actions that may be performed with respect to the user input. The additional output data may include additional natural language output that may be presented to the user 105. In example embodiments, based on the implicit data indicating that the user input corresponds to an important reminder, the reminder skill component 190*a* may determine that an additional action of setting one or more follow-up reminders is to be performed. As used herein, a follow-up reminder may involve the system 120/the device 110 outputting data reminding the user 105 of the initial reminder/action that was set based on the user input. Such follow-up reminders may be presented to the user 105 after an initial reminder (requested in the user input) is presented, and may be presented on a periodic/recurring basis (e.g., every hour, every day, every n hours, every n minutes, etc.) until the user 105 dismisses, cancels or otherwise indicates to stop presenting the reminder.

When the implicit data indicates the requested reminder is important, the reminder skill component 190*a* may, in some embodiments, confirm with the user 105 that a follow-up reminder(s) is to be set. In such embodiments, the reminder skill component 190*a* may send natural language output data to the orchestrator component 130, where, for example, such natural language output data may ask the user whether or not a follow-up reminder is to be set. For example, the natural language output data may be "Would you like me to set follow-up reminders for this task?" The orchestrator 130 may cause the natural language output data to be presented as natural language text and/or synthesized speech (as generated by a TTS component 180). Based on the user's response, the reminder skill component 190*a* may store data that causes a follow-up reminder(s) to be presented to the user 105.

The reminder skill component 190*a* may send (step 9), to the orchestrator component 130, output data corresponding to the user input. The output data may include the output data responsive to the user input (e.g., confirmation that the requested reminder is set). In some cases, depending on the implicit data, the output data may include the additional output data corresponding to the user input (e.g., asking the user whether a follow-up reminder is to be set, informing the user that a follow-up reminder has been set, etc.).

In some embodiments, rather than performing an "additional" action using the implicit data, the reminder skill component 190*a* may use the implicit data to determine an initial action/initial output data responsive to the user input. For example, if the implicit data indicates that the user input requests a reminder for an important event, the reminder skill component 190*a* may perform an action responsive to the user input, where the action may involve storing reminder data that causes output of more than one reminder (e.g., a first reminder and one or more follow-up reminders) for the important event.

The orchestrator component 130 may send (step 10), to the device 110, the output data from the reminder skill component 190*a*, causing the device 110 to present the output data to the user 105. Such output data may be presented by the device 110 as displayed text, icons, graphics, graphical interface elements, etc. Such output data may additionally or alternatively be presented by the device 110 as audio corresponding to synthesized speech, which may be generated using the TTS component 180. In some embodiments, the output data (e.g., a notification including the reminder) may be presented to the user 105 at a later time (e.g., when the reminder time occurs) than when the user input is received.

The notification system(s) 121 may generate notification data 556 (shown in FIG. 5) based on the reminder data determined by the reminder skill component 190*a*. The notification system(s) 121 may send the notification data 556 to the device 110 (or another user device) associated with the user profile identifier for the user 105. Further details regarding the notification output are described below in relation to FIG. 5.

In this manner, the reminder skill component 190*a* may use the implicit data to determine whether an additional action of setting a follow-up reminder, for a reminder requested by the user 105, is to be performed.

The system 120 may use additional components to process the user input and generate outputs responsive to the user input. The system 120 may include the TTS component 180 that generates audio data including synthesized speech. The data input to the TTS component 180 may come from a skill component 190, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

In some cases, the orchestrator component 130 may send the output data from the skill component 190 to the TTS component 180. The TTS component 180 may send output audio data to the orchestrator component 130, where the output audio data represents synthesized speech corresponding to the output data from the skill component 190.

In some cases, the orchestrator component 130 may send (step 9) the output data from the skill component 190 and/or the output audio data from the TTS component 180 to the device 110 for presenting to the user 105. The output data may include text, icons, images, graphics, or other type of data. The output presented to the user 105 via the device 110 may be visual and/or audible. Alternatively or additionally, the system 120 may send output data to another device 110, associated with the user 105.

As shown in FIG. 1, the system 120 may include the user recognition component 195. The user recognition component 195 may recognize one or more users using various data. The user recognition component 195 may take as input the audio data corresponding to the user input (received in step 1). The user recognition component 195 may perform user recognition by comparing speech characteristics, in the audio data, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

In some embodiments, instead of, or in addition to, the ASR component 150 and the NLU component 160, the system 120 may include a SLU component. The SLU component may be equivalent to a combination of the ASR component 150 and the NLU component 160. Yet, the SLU component may process audio data and directly determine the NLU data, without an intermediate step of generating a transcription (e.g., ASR output data). As such, the SLU component may take audio data representing a spoken natural language input and attempt to make a semantic interpretation of the spoken natural language input. That is, the SLU component may determine a meaning associated with the spoken natural language input and then implement that meaning. For example, the SLU component may interpret audio data representing a spoken natural language input in order to derive a desired action. The SLU component may output a most likely NLU hypothesis, or multiple NLU hypotheses associated with respective confidence or other scores (such as probability scores, etc.).

The system 120 may include additional skills. The skill component(s) 190 may be associated with a domain, a non-limiting list of which includes a smart home domain, a music domain, a video domain, a weather domain, a communications domain, a flash briefing domain, a shopping domain, and a custom domain. A "domain" may include various skills relating to a particular area of interest. For example, a music domain may include various skills that can respond to a user's request to play music, enable a user to purchase music, etc. Such skills may be the Amazon Music skill, the Pandora skill, the Spotify skill, etc. In another example, a smart-home domain may include skills that enable a user to control various home devices.

The skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

The system 100 may include one or more notification system(s) 121 which may include an event notification component 500. Although illustrated as a separate system, notification system(s) 121 may be configured within the system 120, the device 110, or otherwise depending on system configuration. For example, event notification component 500 may be configured within the system 120, device 110, or otherwise. The event notification component 500 may handle sending notifications/commands to other devices upon the occurrence of an event. The event notification component 500 may have access to information/instructions (for example as associated with profile storage 170 or otherwise) that indicate what device(s) are to be notified, the preferences associated with those notifications or other information. The event notification component 500 may have access to information/instructions (for example as associated with profile storage 170 or otherwise) that indicate what device(s) are to perform what actions in response to an event. Further detail regarding the event notification component may be found below with regard to FIG. 5.

Figure 2:
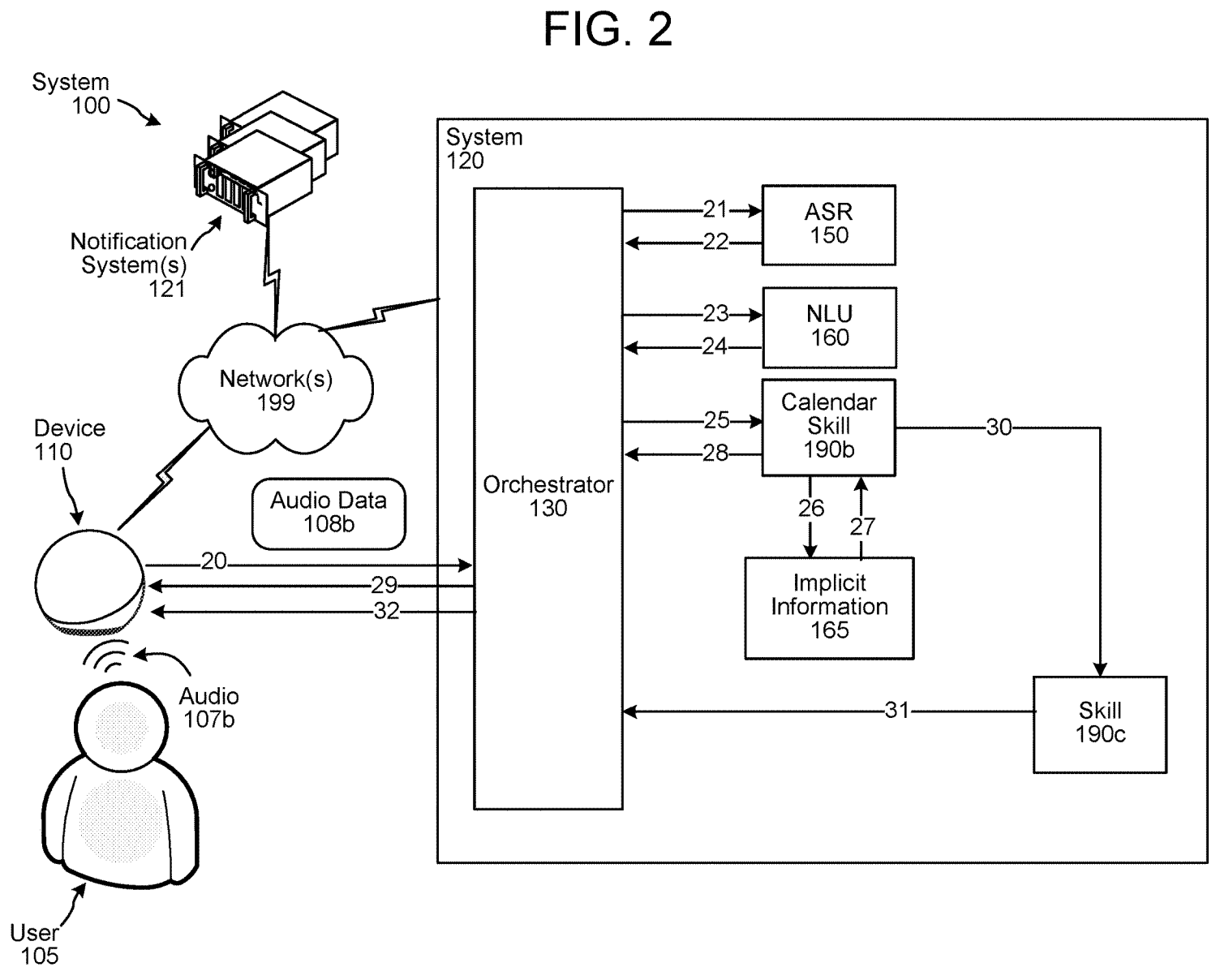

FIG. 2 is a conceptual diagram illustrating an example system 100 for a calendar skill component 190b to use implicit data. As shown in FIG. 2, the system 100 may include the device 110, local to the user 105, connected to the system 120 across one or more networks 199. While not illustrated in FIG. 2, the system 120 of FIG. 2 may also include the profile storage 170, the TTS component 180, and the user recognition component 195.

Referring to FIG. 2, the user 105 may speak an input, and the device 110 may capture audio 107b representing the spoken user input. For example, the user 105 may say "Add a calendar event for John's soccer game on Saturday at 2 p.m." or "Add to [TV show] start time to my calendar." The device 110 may send (step 20) audio data 108b (corresponding to the audio 107b) to the system 120 for processing.

As described above in relation to FIG. 1, in other examples, the user 105 may provide another type of input (e.g., textual input, selection of a button, selection of one or more displayed graphical interface elements, performance of a gesture, etc.), and the device 110 may send other types of input data, such as, image data, text data, etc. to the system 120. In some examples, the device 110 may send more than one types of input data, depending on the type of input(s) provided by the user 105, to the system 120 for processing.

The orchestrator component 130 may send (step 21) the audio data 108b to the ASR component 150. In other examples, the orchestrator component 130 may send the other types of input data to different components, for example, image data to an image processing component, text data to the NLU component 160, gesture input data to a gesture detection component, etc.

In the case of a spoken input, the ASR component 150 may process the audio data 108b and determine ASR output data corresponding to the user input. The ASR component 150 may send (step 22) the ASR output data to the orchestrator component 130. For example, the ASR component 150 may send ASR output data representing that the user input is "Add a calendar event for John's soccer game on Saturday at 2 p.m." As a further example, the ASR component 150 may send ASR output data representing that the user input is "Add to [TV show] start time to my calendar."

The orchestrator component 130 may send (step 23) the ASR output data to the NLU component 160, and the NLU component 160 may process the ASR output data to determine NLU data corresponding to the user input. The NLU component 160 may receive other types of input data (e.g., input text data), and may determine NLU data based on processing the other types of input data. The NLU component 160 may send (step 24) the NLU data to the orchestrator component 130. For example, for the user input "Add a calendar event for John's soccer game on Saturday at 2 p.m.", the NLU data may include intent: AddCalendarEvent, entity type: "Date", entity value: "Saturday", entity type: "Time", entity value: "2 p.m.", entity type: "EventName", entity value: "John's soccer game", and optionally include a skill identifier for the calendar skill component 190*b*. As another example, for the user input "Add to [TV show] start time to my calendar", the NLU data may include intent: AddCalendarEvent, entity type: "Date", entity value: "[TV show date]", entity type: "Time", entity value: "[TV show time]", entity type: "EventName", entity value: "[TV show]", and optionally include a skill identifier for the calendar skill component 190*b*.

The orchestrator component 130 may invoke the calendar skill component 190*b* based on the NLU data indicating the calendar skill component 190*b*. In other embodiments, the system 120 may determine that the calendar skill component 190*b* is to be invoked based on the intent data and/or the entity data included in the NLU data, and/or other data (e.g., user profile data, recently used skills, skills currently in use, etc.). The orchestrator component 130 may send (step 25) the NLU data to the calendar skill component 190*b*.

The calendar skill component 190*b* may invoke the implicit information component 165 by sending (step 26) a request for implicit data corresponding to the user input, where the request may be sent directly to the implicit information component 165 or via another component (e.g., a schedule data aggregation component described below). In some embodiments, the request, from the calendar skill component 190*b*, may include the NLU data corresponding to the user input. In some embodiments, the implicit information component 165 may also receive the ASR data corresponding to the user input (e.g., from the ASR component 150, from the orchestrator component 130, etc.).

In some embodiments, the calendar skill component 190*b* may determine for which user inputs to request implicit data. For example, if the user 105 has enabled a feature that allows for additional information to be presented for calendar events (e.g., weather information for an event, traffic information for an event, etc.), then the calendar skill component 190*b* may not request implicit data for the user input.

Based on receiving the request from the calendar skill component 190*b*, in some embodiments, the implicit information component 165 may determine whether the event requested by the user 105 is an outdoor event or an indoor event. In some embodiments, the implicit information component 165 may also or instead determine whether the requested event requires travel by the user 105. Details on how the implicit information component 165 determines whether an event is an outdoor event or an indoor event or requires travel are described below in relation to FIG. 3A.

The implicit information component 165 may send (step 27), to the calendar skill component 190*b*, the implicit data corresponding to the user input, where in some example embodiments, the implicit data may indicate whether the user input corresponds to an outdoor event or an indoor event. The implicit data may additionally or alternatively indicate whether the user input corresponds to an event that requires travel. For example, for the user input "Add a calendar event for John's soccer game on Saturday at 2 p.m.", the implicit information component 165 may send implicit data representing that the user input corresponds to an outdoor event and/or the user input corresponds to an event that requires travel. As a further example, for the user input "Add to [TV show] start time to my calendar", the implicit information component 165 may send implicit data representing that the user input corresponds to an indoor event and/or the user input corresponds to an event that does not require travel.

In some embodiments, the system 120 may include another component (e.g., a schedule data aggregation component), which may request implicit data, from the implicit information component 165, for one or more events included in one or more electronic calendars for the user 105 and/or other users. The schedule data aggregation component may access calendar data available via the calendar skill component 190*b* and other calendar/scheduling applications. The schedule data aggregation component may access calendar data for a group of users, for example, users of the same household, family, organization, etc. The schedule data aggregation component may provide aggregated schedule data (e.g., for various calendars of the user 105 and/or multiple other users) to the calendar skill component 190*b*, which may in turn, present output data including a representation of the aggregated schedule data. For example, the calendar skill component 190*b* may cause display of a calendar GUI that includes events from family members' electronic calendars, thus, enabling the user 105 to easily view the family's schedule. In some embodiments, the schedule data aggregation component may provide the aggregated scheduled data to the implicit information component 165, which may use the aggregated schedule data to determine certain types of implicit information (e.g., potential event conflicts, schedule anomalies, etc.). The schedule data aggregation component may also provide the implicit data, received from the implicit information component 165, to the calendar skill component 190*b*.

The calendar skill component 190*b* may determine output data responsive to the user input based on processing the NLU data. The output data may be an action to be performed in response to the user input. For example, the action may be adding the requested event to the user's electronic calendar. For further example, the action may be updating an event already represented in the user's electronic calendar. The calendar skill component 190*b* may generate calendar data to perform the action. The output data may include a natural language output to be presented (e.g., by displaying corresponding text and/or by outputting corresponding synthesized speech) to the user 105. The natural language output, for example, may indicate to the user 105 that the requested event has been added to the user's electronic calendar. The calendar skill component 190*b* may send (step 28), to the orchestrator component 130, the output data responsive to the user input. Such output data may indicate to the user 105 the action requested in the user input has been performed (e.g., the requested event has been added to the user's electronic calendar, the user's electronic calendar has been updated, etc.).

The orchestrator component 130 may send (step 29), to the device 110, the output data from the calendar skill component 190*b*, causing the device 110 to present the output data to the user 105. Such output data may be presented by the device 110 as displayed text, icons, graphics, graphical interface elements, etc. Such output data may be presented by the device 110 as audio corresponding to synthesized speech, which may be generated using the TTS component 180. Such output data may be presented via a notification, an email message, a text message, etc. In some embodiments, the output data (e.g., a notification including the calendar event) may be presented to the user 105 at a later time (e.g., when the event time occurs) than when the user input is received.

The notification system(s) 121 may generate notification data 556 (shown in FIG. 5) based on the calendar data determined by the calendar skill component 190*b*. The notification system(s) 121 may send the notification data 556 to the device 110*a* (or another user device) associated with the user profile identifier for the user 105. Further details regarding the notification output are described below in relation to FIG. 5.

The calendar skill component 190*b* may process the implicit data (received in step 27) to determine additional output data corresponding to the user input. The additional output data may correspond to one or more additional actions that may be performed with respect to the user input. The additional output data may include additional natural language output that may be presented to the user 105.

In example embodiments, based on the implicit data indicating that the user input corresponds to an outdoor event, the calendar skill component 190*b* may determine that an additional action of presenting additional information is to be performed. For example, the additional information may relate to the outdoor nature of the event, and may include weather information for the event day, traffic information for traveling to the event from the user's present location, parking information, etc. In some embodiments, the calendar skill component 190*b* may send (step 30) a request to another skill component 190*c* that may store (or otherwise have access to) the additional information. For example, the skill component 190*c* may be a weather skill component, a traffic skill component, a parking skill component, a map/navigation skill component, an event skill component, a ticketing skill component (configured to perform a purchase of a ticket for an event indicated in the user input), etc. The request from the calendar skill component 190*b* may include the NLU data, or data derived from the NLU data, to enable the skill component 190*c* to determine the additional information for the outdoor event (e.g., date and time of the event, location of the event, etc.). The skill component 190*c* may send (step 31), to the orchestrator component 130, output data corresponding to the additional information, and the orchestrator component 130 may send (step 32), to the device 110, the output data to present the additional information to the user 105. For example, the skill component 190*c* may send output data representing weather information for the event. As a further example, the skill component 190*c* may send output data representing traffic information to travel to the event. As another example, the skill component 190*c* may send output data querying the user 105 as to whether a ticket for the output event is to be purchased.

In other embodiments, the calendar skill component 190*b* may send a request for the additional information to another system component, which may be included in the system 120 or may be a component external to the system 120 (e.g., a weather service provider, a traffic service provider, a navigation application, etc.). The other system component may send data corresponding to the additional information to the calendar skill component 190*b*, which in turn may send it to the orchestrator component 130 for presentation to the user 105, or the other system component may send the data corresponding to the additional information directly to the orchestrator component 130 or the device 110 for presentation to the user 105. In some embodiments, the additional information (such as weather information, traffic information, etc.) may be sent by the calendar skill component 190*b* along with the output data or may be included in the output data sent in step 29.

In example embodiments, based on the implicit data indicating that the user input corresponds to an event that requires travel, the calendar skill component 190*b* may determine that an additional action of presenting additional information is to be performed. For example, the additional information may relate to traveling to the location of the event, and may include vehicle traffic information, parking information, transportation options (e.g., flights, bus schedule, train schedule, etc.), estimate time to leave based on traffic, and the like. As described above, the calendar skill component 190*b* may send a request to another component of the system 120 (e.g., the skill component 190*c*), or a component external to the system 120, to retrieve and/or present the additional information relating to traveling to the event.

The additional information, corresponding to the event that the user 105 requests to be added to an electronic calendar (or updated in the electronic calendar), may be presented, in some examples, closer to the event time (e.g., the day of the event, an hour before the event, a day before the event, a week before the event, etc.). In other examples, the additional information may be presented after the event is added to the electronic calendar.

In some embodiments, the calendar skill component 190*b* may confirm with the user 105 that the system can provide additional information relating to the event. In such embodiments, the calendar skill component 190*b* may send natural language output data to the orchestrator component 130, where, for example, such natural language output data may ask the user generally whether additional information can be provided (e.g., "Can I show you information related to the [event]?"), or whether specific additional information can be provided (e.g., "Would you like to receive weather information for the [event]?", "Should I check the traffic for getting to the [event]?", etc.). Based on the user's response, the calendar skill component 190*b* may request additional information from another component of the system 120 (or component external to the system 120), may present the additional information to the user 105, may request another component of the system 120 (or component external to the system 120) to present the additional information, etc.

In this manner, the calendar skill component 190*b* may use the implicit data to determine whether an additional action of providing additional information for a calendar event is to be performed.

In some embodiments, the system 120 may communicate with components implemented by a separate device or system (e.g., a component included on the device 110, included on another user device, included on another system, etc.) providing functionalities for other calendars/calendar applications. Such calendar applications may be associated with the user 105, and may be associated with the system 120 via data stored at the user profile storage 170. Such calendar applications may be associated with other users of the device 110 (e.g., a group of users of a household, a vehicle, a business, etc.). Based on information (e.g., events added to other calendars) available at the other calendar applications, the system 120 (e.g., via the calendar skill component 190*b*) may provide some of the function-alities described herein (e.g., inform the user 105 of con-flicting events, provide weather or traffic information for events, determine locations of events, etc.).

In some embodiments, the system 120 may cause the implicit information component 165 to process calendar data in batches to determine implicit data corresponding to individual events. For example, the implicit information component 165 may process calendar events on a periodic basis (e.g., every 24 hours, once a week, once a month, etc.) to generate the corresponding implicit data. In other embodi-ments, the implicit information component 165 may process calendar data as it becomes available (e.g., when the user 105 adds an event to the calendar).

Although FIGS. 1 and 2 illustrate how a reminder skill component 190*a* and a calendar skill component 190*b* may request and use implicit data, other skill components can request implicit data from the implicit information compo-nent 165 in a similar manner, and the other skill components may perform additional actions, corresponding to a user input, based on the implicit data. Examples of the other skill components and their use of the implicit data are described below.

FIG. 3A illustrates some example components of the implicit information component 165. FIG. 3B illustrates additional example components of the implicit information component 165. As shown, the skill component(s) 190 may send a request to determine implicit data. The request may include ASR data (or other data representing the user input), NLU data (or other data representing an action to be performed), and/or other data. The request may be an API request, and may include data accordingly.

In some embodiments, the implicit information compo-nent 165 may include an implicit data type selector 305, which may be configured to select one or more of the implicit information components (e.g., 310, 320, 330, 340, 350, 370, 380, 390) to execute based on the request from the skill component 190. In some embodiments, the implicit data type selector 305 may select an implicit information component based on which skill component sends the request. For example, if a request from the reminder skill component 190*a* is received, then the implicit data type selector 305 may select an important reminder component 310 and/or a recurring reminder component 320. As a further example, if a request from the calendar skill component 190*b* is received, then the implicit data type selector 305 may select a travel component 330 and/or an outdoor event component 340.

In some embodiments, the implicit data type selector 305 may select an implicit information component based on data (e.g., action data, entity data, etc.) included in the request from the skill component 190. For example, if the action data in the request corresponds to "add a reminder", then the implicit data type selector 305 may select the important reminder component 310 and/or the recurring reminder component 320. As a further example, if the action data in the request corresponds to "add a calendar event", then the implicit data type selector 305 may select a travel compo-nent 330 and/or an outdoor event component 340.

In some embodiments, the request from the skill compo-nent(s) 190 may include one or more types of implicit data that are to be determined. The implicit data type may be identified using an implicit information component identifier or another identifier. For example, the request may indicate the important reminder component 310 is to be invoked.

In some embodiments, the implicit data type selector 305 may determine which implicit information component to invoke using one or more rules, one or more models, stored data, etc. For example, the implicit data type selector 305 may use stored data representing mappings/associations between an intent (which may be included in the request data as part of the NLU data) and a type(s) of implicit data. As another example, the implicit data type selector 305 may use a model, which may be trained using one or more machine learning techniques and may be configured to process data included in or associated with the request (e.g., an intent, an entity(ies), a skill identifier for the skill component 190 requesting the implicit data, time the request is received, etc.) to determine a type(s) of implicit data to determine.

In some embodiments, the implicit data type selector 305 may process context data associated with the user input for which the skill component 190 is requesting implicit data. For example, the implicit data type selector 305 may receive (e.g., from the orchestrator component 130) and process user profile data (e.g., user preferences, demographics, enabled skills, enabled system features, etc.) associated with the user 105, device information (e.g., device type, device capabili-ties, device location, etc.) associated with the device 110, time the user input is received, past interaction data associ-ated with the user 105, content being presented at the device 110 when the user input is received, etc. For example, the context data may indicate that the device 110 is presenting weather information when the user 105 provides the user input, and based on processing such context data and the request from the skill component 190, the implicit data type selector 305 may select the outdoor event component 340 to determine whether the user input (e.g., a user input to add a calendar event, a user input to remind of an event, a user input to generate a message to another person, a user input to generate a note, a user input to navigate to location, etc.) corresponds to an outdoor event or not (for which weather information can be helpful to the user 105).

The implicit data type selector 305 may send a request, a command, or the like to the component(s) it selects to execute/invoke. As part of invoking the component, the implicit data type selector 305 may also send the data included in the request from the skill component 190. Below is description of the individual implicit information compo-nents and the type of data determined and outputted by each.

The important reminder component 310 may be config-ured to determine whether a reminder (e.g., a reminder requested by the user 105) is an important reminder, for which a follow-up reminder(s) should be set, or an unim-portant reminder for which follow-up reminders are not to be set. In some embodiments, the important reminder com-ponent 310 may use one or more rules, one or more models, and/or other techniques.

An example rule may involve expression matching to determine if the reminder content or the user input content matches or is similar to a particular expression(s) (e.g., a word, a set of words, etc.) from a set of stored expressions. Some of the stored expressions may correspond to important reminders, while other of the stored expressions may cor-respond to unimportant reminders. For example, important reminder stored expressions may include the words "pay" and "rent".

Another technique may involve determining a topic cat-egory corresponding to the reminder, and determining that the topic category corresponds to an important reminder or an unimportant reminder. For example, a reminder to pay rent may correspond to a "pay bill" topic category, which may be associated with an important reminder. As a further example, a reminder to watch a TV show may correspond to a "watch TV" topic category, which may be associated with an unimportant reminder. Such techniques may involve using stored data (e.g., a relational database, a hierarchical database, a tree data structure, a graph data structure, etc.) representing mappings/associations between topic categories and an importance label (e.g., important reminder, unimportant reminder, etc.).

An example model may be a machine learning (ML) model, such as a classifier, that may process ASR data and/or NLU data to classify the user input to an important reminder class/category or unimportant reminder class/category. The ML model may be trained using supervised, semi-supervised, or unsupervised learning techniques. The ML model may be configured using training data that may include examples of user inputs requesting a reminder, and the examples may be associated with an important reminder label or an unimportant reminder label.

The important reminder component 310 may output an importance tag 312, which may include data indicating that the reminder is important or that the reminder is unimportant. The importance tag 312 may be a Boolean value (e.g., "true"/"1"/"yes" for an important reminder and "false"/"0"/ "no" for an unimportant reminder). The importance tag 312 may be included in implicit data 360, which may be provided to the skill component(s) 190 in response to the request for implicit data. As discussed below the importance tag 312, and similarly other types of implicit data, can be associated with confidence values generated by the important reminder component 310 (e.g., a model) or the respective implicit information component, and in some cases be provided to the skill component 190.

Now referring to the recurring reminder component 320, which may be configured to determine whether a reminder (e.g., a reminder requested by the user 105) is for a recurring event, for which periodic/recurring reminder(s) should be set. In some embodiments, the recurring reminder component 320 may also determine a duration for the recurring reminder (e.g., a daily reminder, a weekly reminder, a monthly reminder, a yearly reminder, etc.). In some embodiments, the recurring reminder component 320 may use one or more rules, one or more models, and/or other techniques.

An example rule may involve expression matching to determine if the reminder content or the user input content matches or is similar to a particular expression(s) (e.g., a word, a set of words, etc.) from a set of stored expressions which may correspond to recurring reminders and/or recurring duration information. For example, a monthly recurring reminder stored expression may include the word "rent". As another example, a yearly recurring reminder stored expression may include the word "birthday".

Another technique may involve determining a topic category corresponding to the reminder, and determining that the topic category corresponds to a recurring event. For example, a reminder to pay rent may correspond to a "bill" or "utility bill" topic category, which may be associated with a monthly recurring reminder. Such techniques may involve using stored data (e.g., a relational database, a hierarchical database, a tree data structure, a graph data structure, etc.) representing mappings/associations between topic categories and a recurrence label (e.g., recurring event, non-recurring event, etc.), and/or recurrence duration information (e.g., daily, weekly, monthly, annually, etc.).

An example model may be a machine learning (ML) model, such as a classifier, that may process ASR data and/or NLU data to classify the user input to a recurring reminder class/category or another (e.g., non-recurring) class/category. The ML model may be trained using supervised, semi-supervised, or unsupervised learning techniques. The ML model may be configured using training data that may include examples of user inputs requesting a reminder, and the examples may be associated with a recurring reminder label or another label.

In some embodiments, a ML model of the recurring reminder component 320 may be multi-class classifier, where individual classes/categories may correspond to a particular recurring duration. For example, the ML model may classify a reminder to one of a daily recurring reminder class, a weekly recurring reminder class, a monthly recurring reminder class, a yearly recurring reminder class, or a non-recurring reminder class. Training data for such a ML model may include examples of reminders that may be associated with a daily recurring reminder label, a weekly recurring reminder label, a monthly recurring reminder label, a yearly recurring reminder label, or a non-recurring reminder label.

In some embodiments, the recurring reminder component 320 may include a separate ML model to determine the recurring duration information for a reminder. In an example embodiment, a first ML model may classify a reminder to a recurring reminder class or a non-recurring reminder class. In the case that the reminder is classified as a recurring reminder class, a second ML model may determine recurring duration information for the reminder. The second ML model may be a classifier.

In some embodiments, the recurring reminder component 320 may use other data to determine the recurring duration information for a reminder. For example, for a reminder to watch a TV show, the recurring reminder component 320 may communicate with a TV channel guide system, a media streaming service system, or perform an Internet search to determine a schedule of future/new episodes of the TV show, and may determine the recurring duration information based on the schedule. In other embodiments, the recurring reminder component 320 may output recurring duration data indicating that the reminder relates to a recurring event (such as a TV show, a sporting event, etc.) for which the recurring duration information can be determined using additional data, for example, from other data sources (e.g., a TV guide, a sporting event schedule, etc.). Based on receiving such recurring duration data, the skill component 190 may communicate with a data source(s) to determine the recurring duration information for the reminder.

The recurring reminder component 320 may output a recurrence tag 322, which may include data indicating that the reminder is recurring or that the reminder is non-recurring. The recurrence tag 322 may be a Boolean value (e.g., "true"/"1"/"yes" for a recurring reminder and "false"/ "0"/"no" for a non-recurring reminder). The recurrence tag 322 may also include recurring duration information, which may be represented as text data, a numerical value, or other data. For example, the recurrence tag 322 may include "monthly" for a monthly recurring reminder. As another example, the recurrence tag 322 may include "2", which may be associated with a monthly recurring reminder (e.g., according to an API scheme). The recurrence tag 322 may be included in implicit data 360, which may be provided to the skill component(s) 190 in response to the request for implicit data.

Now referring to the travel component 330, which may be configured to determine whether an event (e.g., an event included in a user input from the user 105) corresponds to an event that requires travel. In some embodiments, the travel component 330 may use one or more rules, one or more models, and/or other techniques.

An example rule may involve expression matching to determine if the event content or the user input content matches or is similar to a particular expression(s) (e.g., a word, a set of words, etc.) from a set of stored expressions that correspond to events that require travel. For example, a user input that includes the words "go to" and "game" may match the stored expressions corresponding to an event that requires travel. As a further example, a user input that includes the words "watch", "TV" and "game" may match the stored expressions corresponding to an event that does not require travel.

Another technique may involve determining a topic category corresponding to the event, and determining that the topic category corresponds to an event that requires. For example, a calendar event to go to a soccer game may correspond to a "sporting event" topic category, which may be associated with an event requiring travel. As a further example, a calendar event to watch a game on TV may correspond to a "watch TV" topic category, which may be associated with an event that does not require travel. Such techniques may involve using stored data (e.g., a relational database, a hierarchical database, a tree data structure, a graph data structure, etc.) representing mappings/associations between topic categories and a travel label (e.g., event requiring travel, event not requiring travel, etc.).

An example model may be a machine learning (ML) model, such as a classifier, that may process ASR data and/or NLU data to classify the user input to a travel class/category or non-travel class/category. The ML model may be trained using supervised, semi-supervised, or unsupervised learning techniques. The ML model may be configured using training data that may include examples of user inputs including an event, and the examples may be associated with a travel label or non-travel label.

The travel component 330 may output a travel tag 332, which may include data indicating that the event requires travel or that the event does not require travel. The travel tag 332 may be a Boolean value (e.g., "true"/"1"/"yes" for an event requiring travel and "false"/"0"/"no" for an event that does not require travel). The travel tag 332 may be included in implicit data 360, which may be provided to the skill component(s) 190 in response to the request for implicit data.

Now referring to the outdoor event component 340, which may be configured to determine whether an event (e.g., an event included in a user input from the user 105) corresponds to an outdoor event or an indoor event. In some embodiments, the outdoor event component 340 may use one or more rules, one or more models, and/or other techniques.

An example rule may involve expression matching to determine if the event content or the user input content matches or is similar to a particular expression(s) (e.g., a word, a set of words, etc.) from a set of stored expressions that correspond to outdoor events or indoor events. Some of the stored expressions may be associated with outdoor events, while other of the stored expressions may be associated with indoor events. For example, a user input that includes the words "go to" and "soccer game" may match the stored expressions corresponding to an outdoor event. As a further example, a user input that includes the words "watch" and "TV" may match the stored expressions corresponding to an indoor event.

Another technique may involve determining a topic category corresponding to the event, and determining that the topic category corresponds to an outdoor event or an indoor event. For example, a calendar event to go to a soccer game may correspond to a "sporting event" topic category, which may be associated with an outdoor event. As a further example, a calendar event to watch TV may correspond to a "watch TV" topic category, which may be associated with an indoor event. Such techniques may involve using stored data (e.g., a relational database, a hierarchical database, a tree data structure, a graph data structure, etc.) representing mappings/associations between topic categories and an outdoor event label or an indoor event label.

An example model may be a machine learning (ML) model, such as a classifier, that may process ASR data and/or NLU data to classify the user input to an outdoor event class/category or an indoor event class/category. The ML model may be trained using supervised, semi-supervised, or unsupervised learning techniques. The ML model may be configured using training data that may include examples of user inputs including an event, and the examples may be associated with an outdoor event label or an indoor event label.

The outdoor event component 340 may output an outdoor event tag 342, which may include data indicating that the event corresponds to an outdoor event or that the event corresponds to an indoor event. The outdoor event tag 342 may be a Boolean value (e.g., "true"/"1"/"yes" for an outdoor event and "false"/"0"/"no" for an indoor event). In other embodiments, the outdoor event tag 342 may be text data, a numerical value or other data. For example, the outdoor event tag 342 may include "outdoor" for an outdoor event or "indoor" for an indoor event. As another example, the outdoor event tag 342 may include "1", which may be associated with an outdoor event, or a "2", which may be associated with an indoor event (e.g., according to an API scheme). The outdoor event tag 342 may be included in implicit data 360, which may be provided to the skill component(s) 190 in response to the request for implicit data.

Now referring to a sentiment component 350, which may be configured to determine a sentiment/an emotion corresponding to a user input. In some embodiments, the sentiment component 350 may use one or more rules, one or more models, and/or other techniques.

An example rule may involve expression matching to determine if the user input content matches or is similar to a particular expression(s) (e.g., a word, a set of words, etc.) from a set of stored expressions that correspond to certain sentiments. For example, a user input that includes the word "love" may match the stored expressions corresponding to a user input that corresponds to a happy or love sentiment.

Another technique may involve determining a topic category corresponding to the user input, and determining that the topic category corresponds to a certain sentiment. For example, the user input "I love you" may correspond to a "love message" topic category, which may be associated with a happy or love sentiment. Such techniques may involve using stored data (e.g., a relational database, a hierarchical database, a tree data structure, a graph data structure, etc.) representing mappings/associations between topic categories and a sentiment label (e.g., happy, sad, anger, etc.).

An example model may be a machine learning (ML) model, such as a classifier, that may process ASR data, NLU data and/or audio data to classify the user input to a sentiment class/category. The ML model may be trained using supervised, semi-supervised, or unsupervised learning techniques. The ML model may be configured using training data that may include examples of user inputs, and the examples may be associated with a particular sentiment label.

In some embodiments, the sentiment component 350 may be configured to determine a sentiment from the following classes: happy, sad, neutral, angry, disappointed, and excited. In some embodiments, the sentiment component 350 may be configured to determine an emoji or a graphic corresponding to a sentiment that is relevant to the user input. The sentiment component 350 may determine the emoji or graphic based on a sentiment corresponding to the user input. For example, the sentiment component 350 may determine a heart emoji corresponds to the user input "I love you." As another example, the sentiment component 350 may determine a sad face emoji corresponds to the user input "I am sad."

The sentiment component 350 may output sentiment tag 352 that may be text data, a numerical value, or other data identifying a sentiment corresponding to a user input. For example, the sentiment tag 352 may be "happy", "sad," etc. As another example, the sentiment tag 352 may be "1" associated with a happy sentiment, "2" associated with a sad sentiment, etc. (e.g., according to an API scheme). In some embodiments, the sentiment tag 352 may additional or alternatively include data identifying an emoji or graphic corresponding to a user input. For example, the sentiment tag 352 may be "heart emoji" or "sad face emoji". The sentiment tag 352 may be included in the implicit data 360, which may be provided to the skill component(s) 190 in response to the request for implicit data.

Now referring to FIG. 3B and a location component 370. The location component 370 may be configured to determine a location (e.g., a geographic location such as an address, city, state, region, etc., a location name such as a venue name, restaurant name, etc., a generic location such as bedroom, kitchen, office, etc.) corresponding to a user input. In some embodiments, the location component 370 may use one or more rules, one or more models, and/or other techniques.

In some embodiments, the location component 370 may use named entity recognition or location detection techniques. In some embodiments, the location component 370 may use other data sources (e.g., a map or navigation service, an Internet search, etc.) to determine the location. For example, for the user input "Add [concert name] to my calendar", the location component 370 may determine a venue name and/or an address for the venue where the [concert name] is taking place.

The location component 370 may output a location data 372, which may include data indicating a location corresponding to the user input. The location data 372 may be text data, geographic coordinates, or other data identifying the location. The location data 372 may be included in implicit data 360, which may be provided to the skill component(s) 190 in response to the request for implicit data.

Referring now to a long event component 380, which may be configured to determine whether an event (e.g., included in a user input from the user 105) corresponds to what is referred to herein as a long event that may be associated with a certain duration of time. A long event may be scheduled for a particular duration of time that exceeds a threshold time (e.g., an event that is more than 2 hours, a full-day event, etc.). In some embodiments, the long event component 380 may use one or more rules, one or more models, and/or other techniques.

An example rule may involve expression matching to determine if the event content or the user input content matches or is similar to a particular expression(s) (e.g., a word, a set of words, etc.) from a set of stored expressions that correspond to long events. For example, a user input that includes the words "game" may match the stored expressions corresponding to a long event. As a further example, a user input that includes the words "TV show" may match the stored expressions corresponding to a non-long event.

Another technique may involve determining a topic category corresponding to the event, and determining that the topic category corresponds to a long event. For example, a calendar event to cook a meal (e.g., a user input "Remind me to put the turkey in the oven at 2 p.m.") may correspond to a "cooking" or "baking" topic category, which may be associated with a long event. Such techniques may involve using stored data (e.g., a relational database, a hierarchical database, a tree data structure, a graph data structure, etc.) representing mappings/associations between topic categories and a long event label or non-long event label.

An example model may be a machine learning (ML) model, such as a classifier, that may process ASR data and/or NLU data to classify the user input to a long event class/category or non-long event class/category. The ML model may be trained using supervised, semi-supervised, or unsupervised learning techniques. The ML model may be configured using training data that may include examples of user inputs including an event, and the examples may be associated with a long event label or non-long event label.

The long event component 380 may output a long event tag 382, which may include data indicating that the user input corresponds to a long event. The long event tag 382 may be a Boolean value (e.g., "true"/"1"/"yes" for a long event and "false"/"0"/"no" for a non-long event). The long event tag 382 may be included in implicit data 360, which may be provided to the skill component(s) 190 in response to the request for implicit data.

Referring now to a schedule anomaly component 390, which may be configured to determine whether an event (e.g., included in a user input from the user 105) represents an anomaly in a user's calendar/schedule. A schedule anomaly may refer to an event that may deviate/be different than a recurring set of events of the same/similar kind. In some cases, a schedule anomaly may be identified based on an absence of an event. For example, a user's calendar may include a particular event occurring on a weekly-basis (e.g., piano lessons on Fridays), however, the event may not be scheduled for a particular week, which represents a schedule anomaly. In other cases, a schedule anomaly may be identified based on an event being included. For example, a user's calendar may include a particular event indicating an anomaly (e.g., a calendar event including "early school dismissal", a calendar event including "office closed", etc.). In some embodiments, the schedule anomaly component 390 may use one or more rules, one or more models, and/or other techniques.

An example rule may involve expression matching to determine if the event content or the user input content matches or is similar to a particular expression(s) (e.g., a word, a set of words, etc.) from a set of stored expressions that correspond to schedule anomalies. For example, an event that includes the words "early", "late", or "closed" may match the stored expressions corresponding to a schedule anomaly.

Another technique may involve determining a topic category corresponding to the event, and determining that the topic category corresponds to a schedule anomaly. For example, a calendar event titled "early school dismissal" may correspond to a "school schedule" topic category. The schedule anomaly component 390 may perform further processing on the event content, based on the event corresponding to a particular topic category, to determine whether the event represents a schedule anomaly. Such techniques may involve using stored data (e.g., a relational database, a hierarchical database, a tree data structure, a graph data structure, etc.) representing mappings/associations between topic categories and an anomaly label (e.g., a schedule anomaly, a non-anomaly, etc.).

An example model may be a machine learning (ML) model, such as a classifier, that may process ASR data and/or NLU data to classify the user input to a schedule anomaly class/category or other (non-anomaly) class/category. The ML model may be trained using supervised, semi-supervised, or unsupervised learning techniques. The ML model may be configured using training data that may include examples of user inputs including an event, and the examples may be associated with an anomaly label or non-anomaly label.

In some embodiments, the schedule anomaly component 390 may process other data to determine whether an event represents a schedule anomaly. Such other data may include calendar data associated with the user 105, where the calendar data may correspond to events (past, present, future) included in one or more electronic calendars or other scheduling interfaces. The calendar data may include a date, content, title, location, participants, recurrence information, and other information relating to the individual events. Using the calendar data, the schedule anomaly component 390 can determine whether an instant event represents a schedule anomaly, which may be based on a difference/deviation in date/time, location, participants, content, title, etc. from that of one or more other events represented in the calendar data.

The schedule anomaly component 390 may output an anomaly tag 392, which may include data indicating that the user input corresponds to a schedule anomaly. The anomaly tag 392 may be a Boolean value (e.g., "true"/"1"/"yes" for an anomaly and "false"/"0"/"no" for a non-anomaly). The anomaly tag 392 may be included in implicit data 360, which may be provided to the skill component(s) 190 in response to the request for implicit data.

The components 310, 320, 330, 340, 350, 370, 380 and 390 may employ a combination of rules, models and/or other techniques. The rules may be expression matching rules, rules based on semantic similarities, rules based on topic determination, etc. The models may be machine learning models, such as neural networks, encoders, models to generate word embeddings, etc. The models may be statistical models, such as regression models, linear regression models, probabilistic graphs, etc.

In some embodiments, the implicit data 360 may include a confidence value or a probability value representing a likelihood of the individual implicit data corresponding to the user input. For example, the importance tag 312 may be associated with "0.8" confidence value. The skill component(s) 190 may perform different actions based on the confidence value included in the implicit data 360. The implicit data 360 may include more than one type of implicit data, depending on system configuration, the request from the skill, the components selected by the implicit data type selector, etc. The implicit data 360 may be a data vector including one or more types of implicit data and the respective confidence value.

In some embodiments, the implicit information component 165 may include one or more additional/other implicit information components 395 configured to determine one or more other implicit data 396. For example, the other implicit information component 395 may be configured to determine anomalies in a user's schedule/calendar, and may output other implicit data 396 (which may be included in the implicit data 360) indicating whether a user input corresponds to an anomaly. For example, a user's calendar may have "piano lessons" every Friday, but not this week, then a skill component 190 (e.g., the calendar skill component 190b) may receive the implicit data 360 indicating that this week there is an anomaly. The skill component may then present output data (e.g., display information using a widget, a notification, a card, etc.) at a device, reminding the user that there are no "piano lessons" today. As another example, if a user has a reminder for "early school dismissal", then the skill component 190 may present output data at a device accordingly so that the user does not forget about the early school dismissal.

As described herein, a skill component 190 receives the implicit data 360 and may determine additional actions to be performed corresponding to the user input. Examples of additional actions and skill components are described below. In some embodiments, rather than determining an additional or separate action, the skill component 190 may use the implicit data 360 to determine the initial action or output responsive to the user input. For example, the skill component 190 may determine, without using the implicit data 360, first output data responsive to an action requested in a user input, and using the implicit data 360, the skill component 190 may determine second/different output data responsive to the same requested action.

The reminder skill component 190a may use the implicit data 360, which identifies additional semantic information corresponding to a user input, such as outdoor versus indoor event, important reminder, recurring reminder, etc., to determine additional actions corresponding to a requested reminder. Based on the implicit data 360 including the outdoor event tag 342 and/or the travel tag 332, the reminder skill component 190a can cause presentation of traffic information and weather information. In some examples, the reminder skill component 190a may present reminders and/or other tasks within a summary schedule view so that a user does not miss or forget them. To ensure that important tasks are completed (based on the importance tag 312), upon delivery of a reminder, the reminder skill component 190a may also ask a user to acknowledge the ones tagged important. In the absence of an acknowledgement, the reminder skill component 190a may present follow-up reminders. For recurring reminders (based on the recurrence tag 322), the reminder skill component 190a may present reminders on a periodic-basis that may be appropriate for the event included in the reminder.

The calendar skill component 190b may use the implicit data 360 to determine additional actions corresponding to a calendar event. The calendar skill component 190b can help a user plan their event by providing weather and traffic information, based on the outdoor event tag 342, the travel tag 332, the location data 372 and/or the long event tag 382. For example, the calendar skill component 190b can cause presentation of weather reports, driving times, bus schedules, etc. As another example, the calendar skill component 190b may present a "get ready to leave" notification so that a user can reach the event on time. As yet another example, the calendar skill component 190b may let the user know when a particular long-event may overlap with another event on the user's calendar.

In some embodiments, a skill component 190 may determine an additional action of presenting traffic information based on the implicit data 360 indicating that an event requires travel (the travel tag 332) and/or the implicit data 360 including the location data 372, where a location indicated by the location data 372 is different than the user's 105/device 110 location.

A skill component 190 that is configured to communicate messages, such as a text message, an email message, a note, etc., may use the implicit data 360 (e.g., the sentiment tag 352) to determine relevant emojis and/or graphics based on the message content. For example, a note that says you're "awesome" or "good luck today" may correspond to a different emoji/graphic than a note that says "buy groceries" or "don't forget to clean your room." The skill component 190 may use the sentiment tag 352 to determine other types of actions that may involve, for example, determining and inserting a punctuation marks (e.g., an exclamation mark), determining and using a particular color to present the message (e.g., font color, background color, note color, etc.), determining and selecting a particular synthesized voice profile for "reading" the message (e.g., a voice profile conveying a particular sentiment/emotion that is used by the TTS component to generate synthesized speech), categorizing messages (e.g., grouping like sentiment messages together to enable display, filtering, searching, etc.), and other actions. Other skills, like the reminder skill component 190a or the calendar skill component 190b, may use the sentiment tag 352 to perform the foregoing examples actions with respect to reminders and/or calendar events.

Below are example voice-based interactions between the user 105 and the system 120 based on using the implicit data 360. Similar example interactions can be achieved via other types of user inputs and other types of output.

One example for proactively providing weather and traffic for an outdoor event, may involve the user 105 saying "Alexa, add [city] flight next Monday at 8 a.m. to my calendar", the system 120 responding "Ok, I have added that", and the system 120 further responding "By the way, the weather next Monday in [city] is 79 degrees with clear sky and sun."

One example for detecting long events to avoid scheduling conflicts, may involve the user 105 saying "Alexa, set a reminder to roast the turkey at 4 p. m.", the system 120 responding "Ok, I'll remind you", and the system 120 further responding "That will have the turkey ready for dinner at 7:30 pm. You have a calendar event set for 5 p. m. Does that work?"

One example for predicting emojis may involve the user 105 saying "Alexa, send Julie a note that says 'good luck today we love you", the system 120 responding "Ok I've made a note", and the system 120 further responding "That's a lovely note. Would you like to add a heart emoji to it?"

One example for suggesting a recurring duration for reminders may involve the user 105 saying "Alexa, remind me to call mom on July $7^{th}$ to wish her happy birthday", the system 120 responding "Alexa: OK, I'll remind you", and the system 120 further responding "Would you like to make this a yearly reminder to wish her happy birthday?"

Some embodiments of the present disclosure can use an implicit information component that is personalized/customized for a user or a group of users. FIG. 4 is a conceptual diagram illustrating an example personalized implicit information component 410. The personalized implicit information component 410 may include multiple implicit information components, like the implicit information component 165, configured to determine different types of implicit information. The personalized implicit information component 410 may be configured/trained using data specific to the user 105 or a group of users (e.g., a group of similar users).

The personalized implicit information component 410 may be configured using user profile data associated with the user 105 or the group of users. The user profile data may include user information (e.g., demographics, occupation, etc.), device information for devices 110 associated with the user profile, user preferences, skills enabled for the user profile, system features enabled for the user profile (e.g., follow-up mode, brief mode, do not disturb mode, etc.), other applications (e.g., external calendars, etc.) integrated with the system 120, and the like.

In some embodiments, the personalized implicit information component 410 may be configured using historic input data associated with the user 105 or the group of users. The historic input data may be data corresponding to historic user inputs provided by the user 105 or the group of users. Such historic input data may correspond to users' preferences or indicate user interaction patterns, which may be used by the personalized implicit information component 410 to determine implicit information for a particular user or group of users. For example, using the historic input data, the personalized implicit information component 410 may determine that the user 105 provides the user input "add reminder to buy groceries" at the beginning of the month, and also requests follow-up reminders for the task. As another example, using the historic input data 424, the personalized implicit information component 410 may determine that the user 105 provides the user input "add John's game to my calendar", and requests traffic information prior to the event.

The personalized implicit information component 410 may be configured using historic context data corresponding to the historic input data. The historic context data may be device information (e.g., device type, device identifier, device location, etc.) for the device 110 that received the past user input, a time and date when the past user input was received, whether a skill component was in-focus, and other context information.

The personalized implicit information component 410 may be configured using user feedback data representing feedback provided by the user 105 or the group of users. The user feedback data 426 may relate to past additional actions performed by a skill component 190 with respect to past user inputs, where the past additional actions may have been determined based on past implicit data corresponding to the past user inputs. For example, in response to the system 120 presenting traffic information prior to a calendar event, the user 105 may provide feedback indicating that the user does not want to receive such traffic information. As another example, in response to the system 120 providing a follow-up reminder for an event, the user 105 may provide feedback indicating that the user found the follow-up reminder useful.

After the personalized implicit information component 410 is configured for the user 105 (or the group of users including the user 105), it may be used to determine personalized implicit data 440. As shown in FIG. 4, in some embodiments, the personalized implicit information component 410 may receive the implicit data 360 determined by the implicit information component 165 and corresponding to the user input provided by the user 105. The personalized implicit data 440 may be provided to the skill component 190 in addition to or instead of the implicit data 360.

The personalized implicit information component 410 may also receive user profile data 420 associated with the user 105 and stored in the profile storage 170. The user profile data 420 may represent user information, enabled skills, enabled system features, user preferences, etc.

The personalized implicit information component 410 may also receive context data 422 associated with the user input. The context data 422 may represent device information for the device 110 that received the user input, time and date when the user input is received, skill component in-focus, content being actively presented (e.g., displayed, audio playback, etc.) at the device 110, device state, and other context information.

The personalized implicit information component 410 may also receive user input data 424, which may be the ASR data and/or the NLU data corresponding to the user input. The user input data 424 may include other data, such as image data, audio data, gesture data, etc.

The personalized implicit information component 410 may process the received data, and determine the personalized implicit data 440 corresponding to the user input. In some cases, the personalized implicit data 440 may be different than the implicit data 360. In other cases, the personalized implicit data 440 may be similar to the implicit data 360. For example, for the user input "remind me to buy groceries," the implicit data 360 may indicate that the requested reminder is an unimportant reminder, which does not require follow-up reminders. The personalized implicit data 440 may indicate that the requested reminder is an important reminder for the user 105 and for which follow-up reminders are to be provided. Being configured using the historic input data, which may indicate that the user 105 requests follow-up reminders for "remind me to buy groceries", the personalized implicit information component 410 may determine the foregoing example personalized implicit data 440. Using the personalized implicit data 440, the reminder skill component 190a may present follow-up reminders to the user 105.

Figure 5:
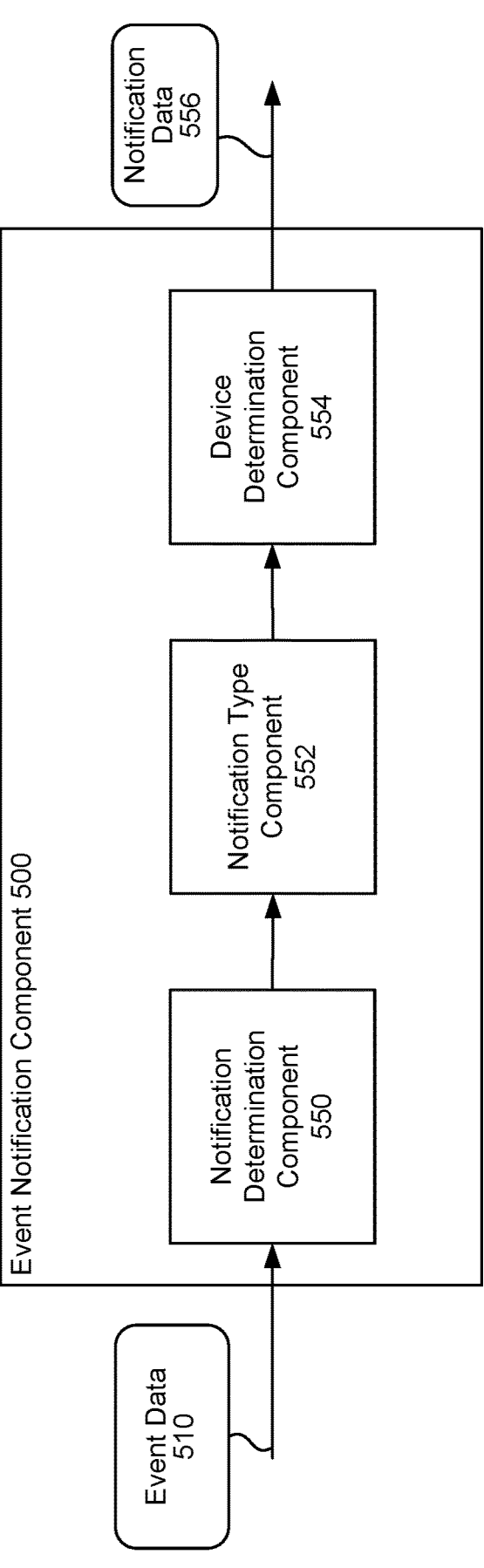
FIG. 5 illustrates an event-notification component according to embodiments of the present disclosure.

FIG. 5 illustrates example components of an event-notification component 500, which may be included in the notification system(s) 121. As shown in FIG. 5, the event-notification component 500 may include a notification-determination component 550, a notification-type component 552, and/or a device-determination component 554. The notification-determination component 550 may receive event data 510 and determine if a notification corresponding to the event(s) should be sent to one or more device(s). The event data 510 may be reminder data (e.g., determined by the reminder skill component 190a representing a reminder for an event), calendar data (e.g., determined by the calendar skill component 190b representing an event on an electronic calendar), weather data, traffic data, communication data, or other type of data that the user may be notified of. The notification-determination component 550 may determine that a notification corresponding to the event data 510 should be sent to a user device. In some cases, the event data 510 may relate to an event for which the notification-determination component 550 may determine that no notification is to be sent. The notification-determination component 550 may make this determination by determining data identifying the event and determining a corresponding user preference (as stored in, for example, the profile storage 170/670) for receiving notifications corresponding to the event. That is, a user of the device 110 may have input a preference for receiving a notification corresponding to a particular event, and the notification-determination component 550 may determine to send a notification based on the preference. In some embodiments, the notification-determination component 550 determines whether or not to send a notification based at least in part on the type of the event.

The notification-type component 552 may determine the type of the notification to be sent. Types of notifications may include text messages, emails, phone calls, push notifications, or other such notifications. Like the notification-determination component 550, the notification-type component 552 may determine the type of the notification based on a user preference stored in the profile storage 170/670. The notification-type component 552 may similarly determine the type of the notification based on the type of the event, wherein event reminders may correspond to a first type of notification, such as a visual reminder and an audible reminder, while other types of events may correspond to a second type of notification, such as an email.

A device-determination component 554 may determine which of a potential plurality of user devices should receive the notification(s). In some embodiments, the device-determination component 554 may determine that the notification(s) (e.g., notification data 556) are to be sent to every device associated with a user account stored in the profile storage 170/670. In other embodiments, the device-determination component 554 determines that the notification(s) are to be send to a subset of the devices. For example, for one event (e.g., a high priority event) a user may indicate that every device associated with the user profile be notified. In another example, for a different event (e.g., a low priority event) a user may indicate that only a single specific device associated with the user profile be notified. In another example, a user may indicate that another device outside the user profile be notified (e.g., other users that may be participants of the calendar event).

Figure 6:
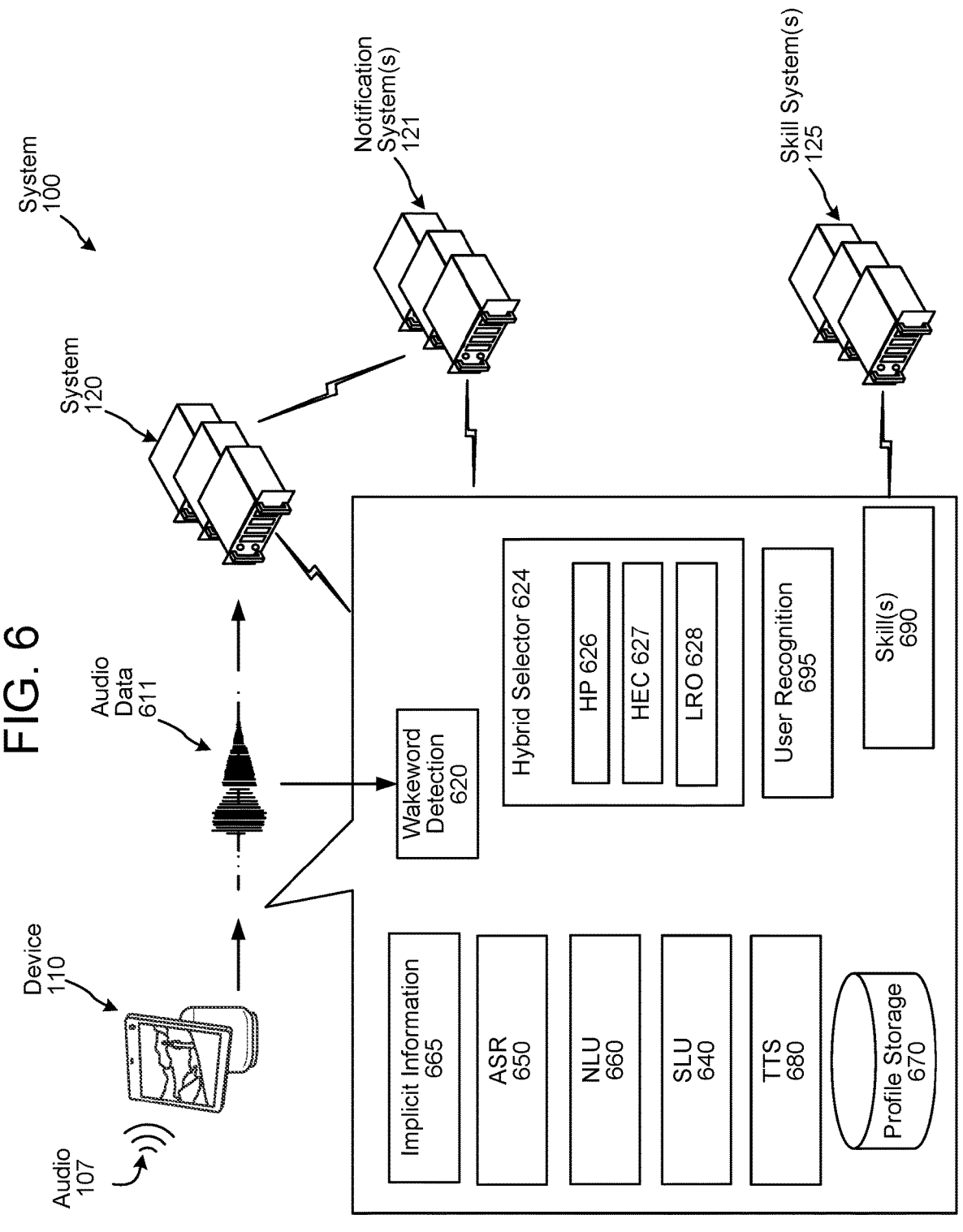
FIG. 6 is a conceptual diagram illustrating components that may be included in a device, according to embodiments of the present disclosure.

The system 100 may use other components illustrated in FIGS. 1 and 6, which are further described herein. The various components of the system 100 may be located on a same or different physical devices. Communication between various components may occur directly or across the network(s) 199.

The system 120 may perform processing to facilitate user input processing and generation of an output responsive to the user input. A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 620

(shown in FIG. 6). The wakeword detection component 620 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 620 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword detection component 620 detects a wakeword, the device 110 may "wake" and begin transmitting audio data 611, representing the audio, to the system 120. The audio data 611 may include the detected wakeword, or the device 110 may remove the portion of the audio data, corresponding to the detected wakeword, prior to sending the audio data 611 to the system 120.

The foregoing describes illustrative components and processing of the system 120. The following describes illustrative components and processing of the device 110. As illustrated in FIG. 6, in at least some embodiments the system 120 may receive audio data 611 from the device 110, to recognize speech corresponding to a spoken natural language in the received audio data 611, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 620 configured to detect a wakeword (e.g., "Alexa") that indicates to the device 110 that the audio data 611 is to be processed for determining NLU output data. In at least some embodiments, a hybrid selector 624, of the device 110, may send the audio data 611 to the wakeword detection component 620. If the wakeword detection component 620 detects a wakeword in the audio data 611, the wakeword detection component 620 may send an indication of such detection to the hybrid selector 624. In response to receiving the indication, the hybrid selector 624 may send the audio data 611 to the system 120 and/or an on-device ASR component 650. The wakeword detection component 620 may also send an indication, to the hybrid selector 624, representing a wakeword was not detected. In response to receiving such an indication, the hybrid selector 624 may refrain from sending the audio data 611 to the system 120, and may prevent the ASR component 650 from processing the audio data 611. In this situation, the audio data 611 can be discarded.

The device 110 may conduct its own speech processing using on-device language processing components (such as an on-device SLU component 640, an on-device ASR component 650, and/or an on-device NLU component 660) similar to the manner discussed above with respect to the system-implemented ASR component 150, and NLU component 160. The device 110 may also internally include, or otherwise have access to, other components such as one or more skills 690 (which may process similar to the skill components 190), a user recognition component 695 (configured to process in a similar manner to the system-implemented user recognition component 195), profile storage 670 (configured to store similar profile data to the system-implemented profile storage 170), a TTS component 680 (configured to process in a similar manner to the system-implemented TTS component 180), and other components. One or more of the components may be customized/personalized for a user (or group of users) of the device 110. In at least some embodiments, the on-device profile storage 670 may only store profile data for a user or group of users specifically associated with the device 110.

In some embodiments, the device 110 may include an implicit information component 665 that may be configured in a similar manner as the implicit information component 165 described herein, and may perform one or more similar functionalities. In some embodiments, the implicit information component 665 may include or use the personalized implicit information component 410 (described in relation to FIG. 4), which may be configured for the user 105 (or group of users) of the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 611 to pass to the system 120 while also receiving (e.g., intercepting) this audio data 611 and sending the audio data 611 to the HEC 627.

In at least some embodiments, the hybrid selector 624 may further include a local request orchestrator (LRO) 628 configured to notify the ASR component 650 about the availability of the audio data 611, and to otherwise initiate the operations of on-device language processing when the audio data 611 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 611 is received, the HP 626 may allow the audio data 611 to pass through to the system 120 and the HP 626 may also input the audio data 611 to the ASR component 650 by routing the audio data 611 through the HEC 627 of the hybrid selector 624, whereby the LRO 628 notifies the on-device ASR component 650 of the audio data 611. At this point, the hybrid selector 624 may wait for response data from either or both the system 120 and/or the on-device language processing components. However, the disclosure is not limited thereto, and in some examples the hybrid selector 624 may send the audio data 611 only to the on-device ASR component 650 without departing from the disclosure. For example, the device 110 may process the audio data 611 on-device without sending the audio data 611 to the system 120.

The ASR component 650 is configured to receive the audio data 611 from the hybrid selector 624, and to recognize speech in the audio data 611, and the on-device NLU component is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component) may be selected as usable to respond to a natural language input, and local response data may be sent (e.g., local NLU output data, local knowledge base information, internet search results, and/or local directive data) to the hybrid selector 624, such as a "ReadyToExecute" response. The hybrid selector 624 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

In some embodiments, instead of, or in addition to, the ASR component 650 and the NLU component 660, the device 110 may include the SLU component 640. The SLU component 640 may be equivalent to a combination of ASR processing and NLU processing. Yet, the SLU component 640 may process audio data and directly determine the NLU data, without an intermediate step of generating a transcription (e.g., ASR output data). As such, the SLU component 640 may take the audio data 611 representing a spoken natural language input and attempt to make a semantic interpretation of the spoken natural language input. That is, the SLU component 640 may determine a meaning associated with the spoken natural language input and then implement that meaning. For example, the SLU component 640 may interpret audio data representing a spoken natural language input in order to derive a desired action. The SLU component 640 may output a most likely NLU hypothesis, or multiple NLU hypotheses associated with respective confidence or other scores (such as probability scores, etc.).

The device 110 and/or the system 120 may associate a unique identifier with each natural language input. The device 110 may include the unique identifier when sending the audio data 611 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
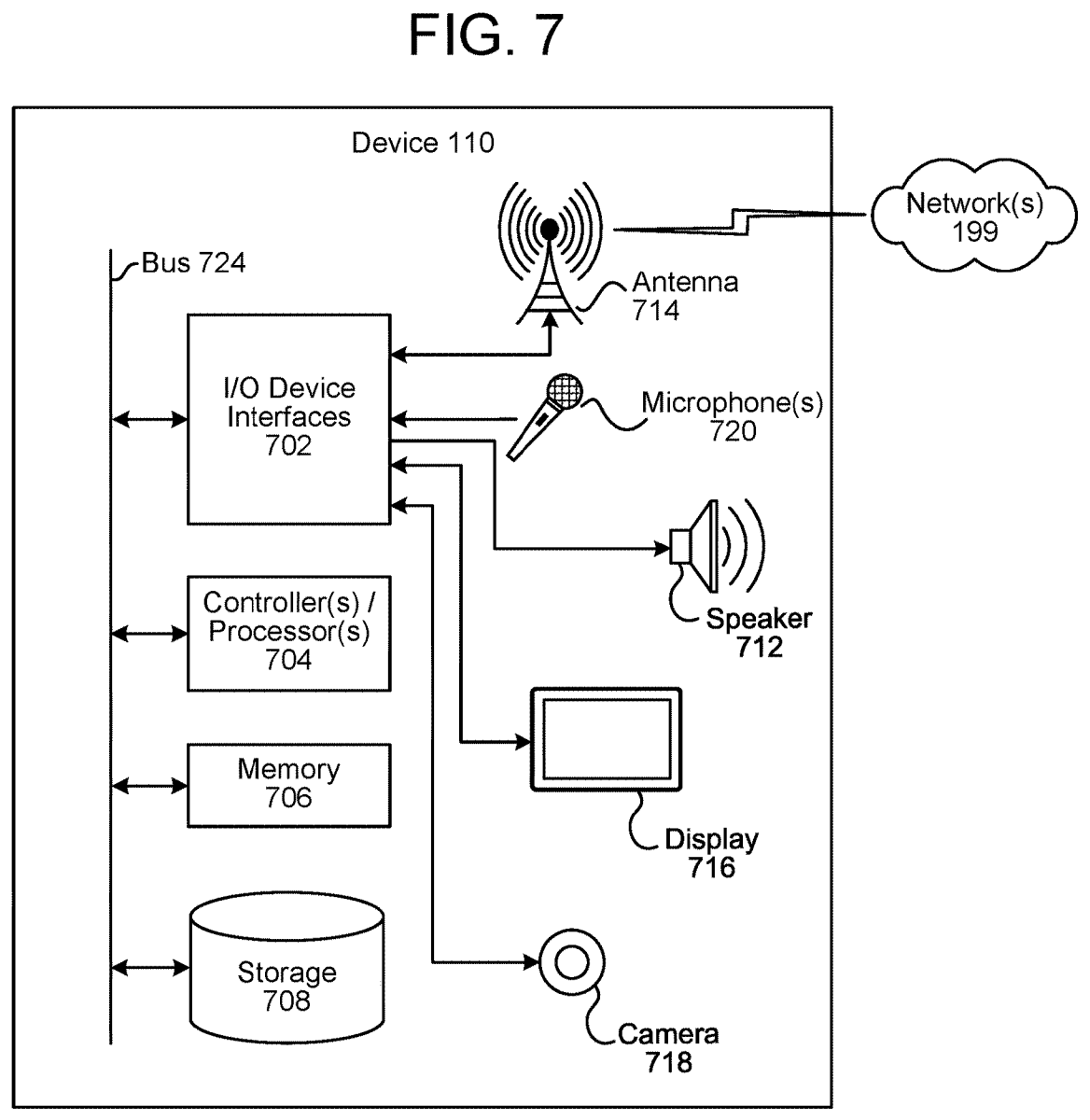
Figure 8:
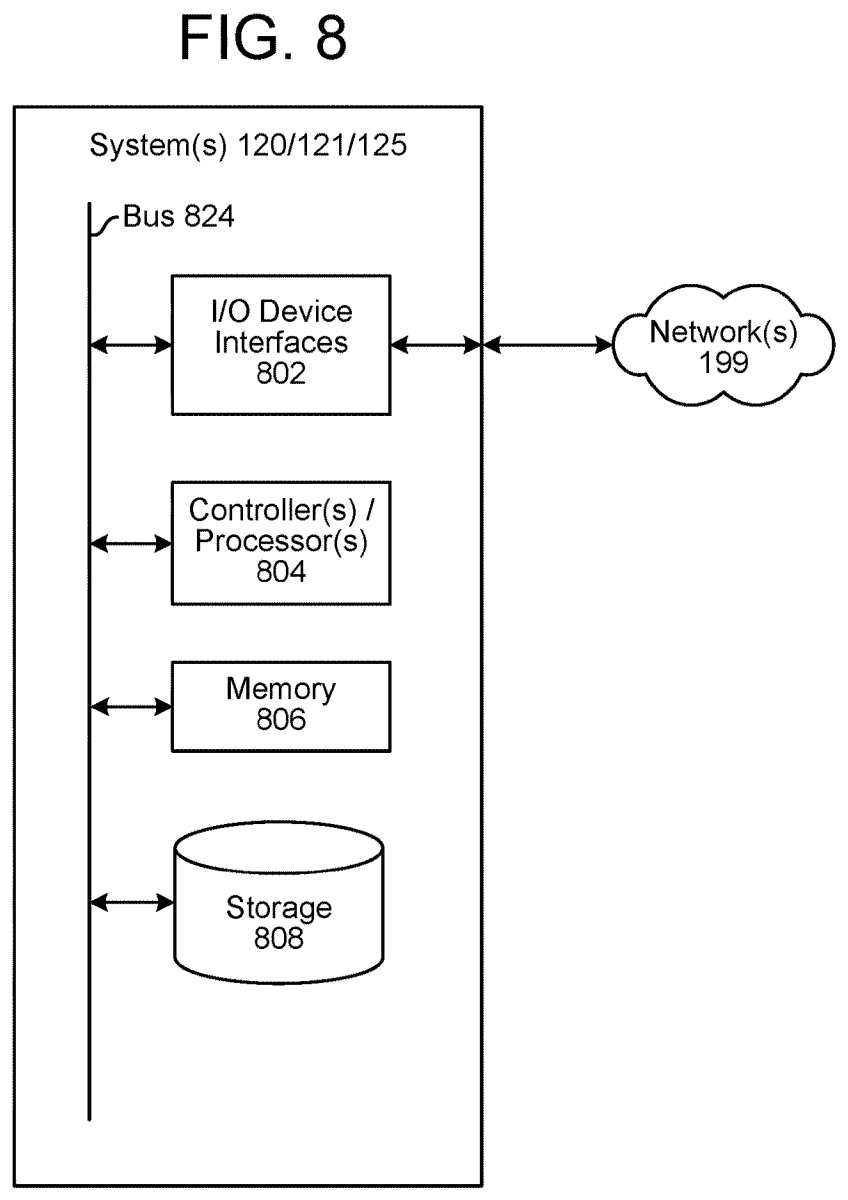

FIG. 7 is a block diagram conceptually illustrating a device 110 of the system 100. FIG. 8 is a block diagram conceptually illustrating example components of a system, such as the system 120, the notification system(s) 121, and the skill(s) system 125. A system (120/121/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/121/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/121/125) may be included in the system 100 of the present disclosure, such as, one or more systems 120, one or more notification systems 121, and/or one or more skills 125. In operation, each of these systems may include computer-readable and computer-executable instructions that reside on the respective device (120/121/125), as will be discussed further below.

Each of these devices (110/120/121/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/121/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/121/125) may also be connected to removable or external non-volatile memory and/or storage (such as a removable memory card, memory key drive, networked storage, etc.) through respective input/output device interfaces (702/802).

Computer instructions for operating each device (110/120/121/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/121/125) includes input/output device interfaces (702/802). A variety of components may be connected through the input/output device interfaces (702/802), as will be discussed further below. Additionally, each device (110/120/121/125) may include an address/data bus (724/824) for conveying data among components of the respective device. Each component within a device (110/120/121/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device 110, the system 120, the notification system 121, and/or skill 125 may include their own dedicated processors, memory, and/or storage. Alternatively, one or more of the components of the device 110, the system 120, the notification system 121, and/or skill 125 may utilize the I/O interfaces (702/802), processor(s) (704/804), memory (706/806), and/or storage (708/808) of the device 110, the system 120, the notification system 121, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, the notification system 121 and the skill system 125, as described herein, are illustrative, and may be located as a stand-alone device or may be included, in whole or in part, as a component of a larger device or system.

Figure 9:
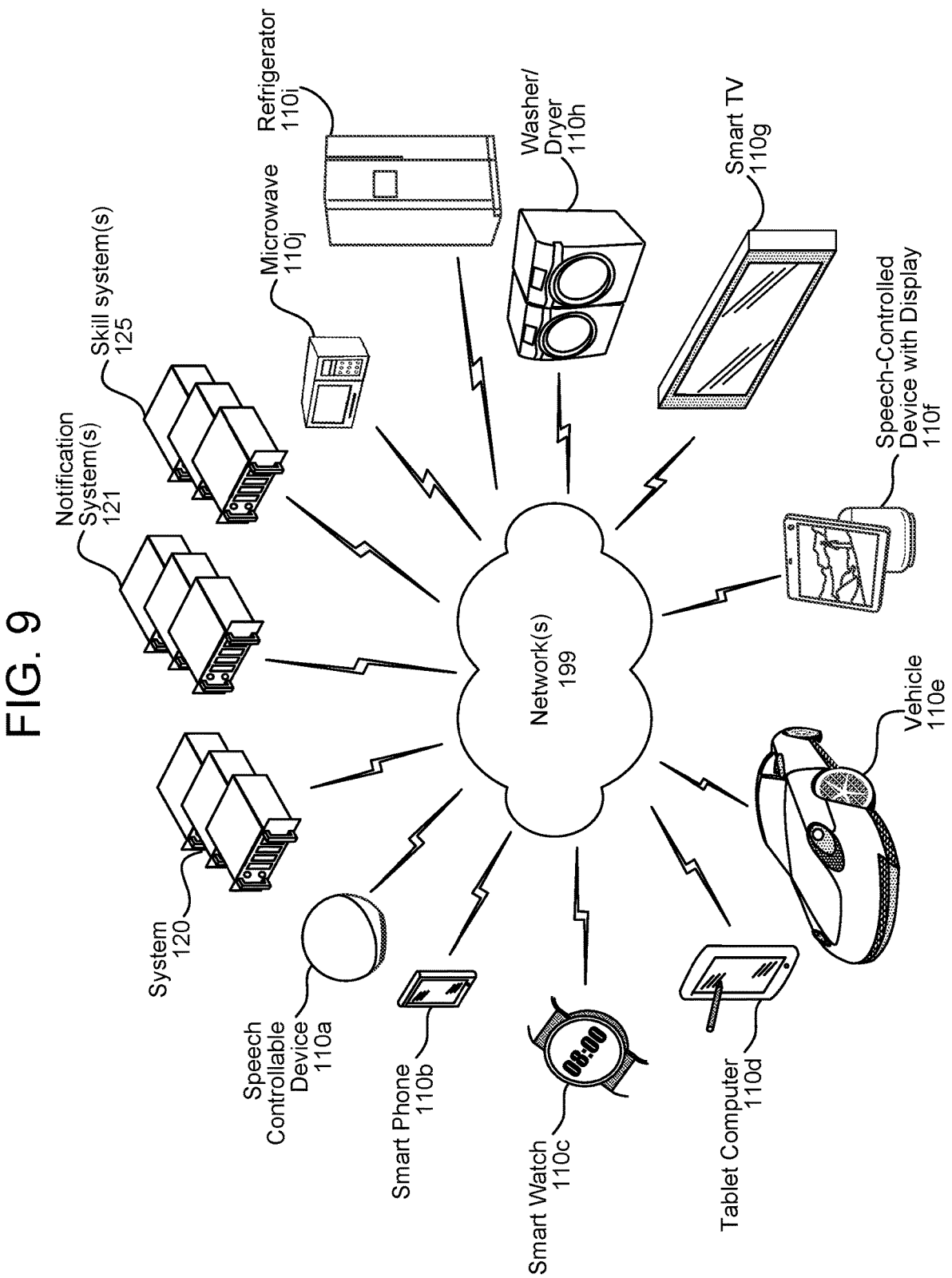
FIG. 9 illustrates an example of a computer network for use with the overall system, according to embodiments of the present disclosure.

As illustrated in FIG. 9, multiple devices (110a-110j, 120, 121, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the notification system 121, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving, from a device, audio data corresponding to a spoken input;

determining, using the audio data, that the spoken input requests a first action be performed with respect to an event;

determining a skill component capable of performing the first action;

sending, to the skill component, a representation of the spoken input to enable the skill component to:

perform the first action corresponding to the event, and generate first output data indicating the first action has been performed;

causing presentation of the first output data;

receiving, from the skill component, a request for implicit information corresponding to the spoken input;

in response to receiving the request, processing, using a machine learning model, the representation of the spoken input to determine the event corresponds to a first category, wherein the machine learning model is configured to classify the representation of the spoken input to at least one of the first category and a second category, wherein the first category corresponds to a second action and the second category corresponds to a third action, wherein the second action is different than the first action and is not explicitly requested in the spoken input;

sending an indication of the first category to the skill component to enable the skill component to perform the second action in response to the spoken input;

after sending the indication of the first category, receiving, from the skill component, second output data indicating the second action has been performed; and causing presentation of the second output data.

2. The computer-implemented method of claim 1, further comprising:

receiving, from the device, second audio data corresponding to a second spoken input;

determining, using the second audio data, that the second spoken input requests a second event be added to an electronic calendar;

determining a second skill component capable of adding the second event to the electronic calendar;

sending, to the second skill component, first data corresponding to the second spoken input to enable the second skill component to generate:

calendar data corresponding to adding the second event to the electronic calendar, and third output data indicating the second event has been added to the electronic calendar;

causing presentation of the third output data;

receiving, from the second skill component, a second request for second implicit information corresponding to the second spoken input;

processing, in response to receiving the second request and using a second machine learning model, the first data to determine the second event corresponds to an important event category;

sending an indication of the important event category to the second skill component to enable the second skill component to perform a fourth action; and causing presentation of fourth output data based on performance of the fourth action.

3. The computer-implemented method of claim 1, further comprising:

receiving second audio data corresponding to a second spoken input associated with a user profile;

determining, using the second audio data, that the second spoken input requests a fourth action be performed with respect to a second event;

sending, to the skill component, first data corresponding to the second spoken input to enable the skill component to:

perform the fourth action corresponding to the second event, and generate third output data indicating the fourth action has been performed;

causing presentation of the third output data;

receiving, from the skill component, a second request for second implicit information corresponding to the second spoken input;

processing, in response to receiving the second request and using the machine learning model, the first data to determine the second event does not correspond to an unimportant event category;

processing, using a second machine learning model associated with the user profile, the first data to determine the second event corresponds to an important event category, wherein the second machine learning model is configured using historic input data associated with the user profile and representing past user inputs corresponding to the skill component;

sending an indication of the important event category to the skill component;

after sending the indication of the important event category, receiving, from the skill component, fourth output data indicating that a fifth action has been performed for the second event; and causing presentation of the fourth output data.

4. The computer-implemented method of claim 1, further comprising:

determining the request corresponds to whether the event corresponds to an outdoor event type;

selecting, from a set of machine learning models, the machine learning model to respond to the request based at least in part on the machine learning model being configured to determine whether an event corresponds to the outdoor event type, the set of machine learning models being configured to determine different event types;

receiving, from the skill component, a second request for second implicit information as to whether the event corresponds to a recurring event type;

selecting, from the set of machine learning models, a second machine learning model to respond to the second request, wherein the second machine learning model is configured to determine whether an event corresponds to the recurring event type;

determining, using the second machine learning model and the representation of the spoken input, that the event corresponds to the recurring event type; and sending, to the skill component, an indication of the recurring event type to further enable the skill component to perform a fourth action with respect to the event.

5. A computer-implemented method comprising:

receiving a user input requesting performance of a first action;

sending a representation of the user input to a skill component capable of performing the first action;

receiving, from the skill component, a request for implicit information corresponding to the user input;

in response to receiving the request, processing, using a machine learning model, the user input to determine implicit data representing the user input corresponds to a first category, wherein the machine learning model is configured to classify the user input to at least one of the first category and a second category, wherein the first category corresponds to a second action and the second category corresponds to a third action, wherein the second action is different than the first action and is not explicitly requested in the user input; and based on the implicit data and in addition to performance of the first action, causing performance of the second action in response to the user input.

6. The computer-implemented method of claim 5, further comprising:

based on receiving the request for the implicit information from the skill component, selecting the machine learning model from a set of machine learning models configured to generate implicit information.

7. The computer-implemented method of claim 5, wherein:

the user input requests a reminder to be provided for an event;

the skill component is capable of causing presentation of the reminder for the event;

the implicit data represents that the event corresponds to an important event for which a follow-up reminder is to be provided; and the computer-implemented method further comprises receiving, from the skill component, output data representing that at least one follow-up reminder has been generated.

8. The computer-implemented method of claim 5, wherein;

the user input requests an event to be added to an electronic calendar;

the skill component is capable of generating calendar data that causes the event to be added to the electronic calendar;

the implicit data represents that the event corresponds to an outdoor event for which weather information is to be provided; and the computer-implemented method further comprises causing presentation of the weather information along with a representation of the calendar data.

9. The computer-implemented method of claim 5, wherein:

the user input requests an event to be added to an electronic calendar;

the skill component is capable of generating calendar data that causes the event to be added to the electronic calendar;

the implicit data represents that the event corresponds to an event requiring travel for which traffic information is to be provided; and the computer-implemented method further comprises causing presentation of the traffic information along with a representation of the calendar data.

10. The computer-implemented method of claim 5, further comprising:

receiving a second user input requesting performance of the first action, the second user input being associated with a user profile;

receiving, from the skill component, a second request for second implicit information corresponding to the second user input; and in response to receiving the second request, determining, using a personalized implicit information component associated with the user profile and a representation of the second user input, second implicit data that is different than the implicit data.

11. The computer-implemented method of claim 5, further comprising:

determining automatic speech recognition (ASR) data corresponding to the user input;

determining, using the ASR data, first data including an intent and an entity corresponding to the user input; and processing the first data to determine the implicit data.

12. A system comprising:

at least one processor; and at least one memory including instructions that, when executed by the at least one processor, cause the system to:

receive a user input requesting performance of a first action;

send a representation of the user input to a skill component capable of performing the first action;

receive, from the skill component, a request for implicit information corresponding to the user input;

in response to the request, process, using a machine learning model, the user input to determine implicit data representing the user input corresponds to a first category, wherein the machine learning model is configured to classify the user input to at least one of the first category and a second category, wherein the first category corresponds to a second action and the second category corresponds to a third action, wherein the second action is different than the first action and is not explicitly requested in the user input; and based on the implicit data and in addition to performance of the first action, cause performance of the second action in response to the user input.

13. The system of claim 12, wherein the at least one memory includes further instructions that, when executed by the at least one processor, further cause the system to:

based on receiving the request for the implicit information from the skill component, select the machine learning model from a set of machine learning models configured to generate implicit information.

14. The system of claim 12, wherein;

the user input requests a reminder to be provided for an event;

the skill component is capable of causing presentation of the reminder for the event;

the implicit data represents that the event corresponds to an important event for which a follow-up reminder is to be provided; and the at least one memory includes further instructions that, when executed by the at least one processor, further cause the system to receive, from the skill component, output data representing that at least one follow-up reminder has been generated.

15. The system of claim 12, wherein:

the user input requests an event to be added to an electronic calendar;

the skill component is capable of generating calendar data that causes the event to be added to the electronic calendar;

the implicit data represents that the event corresponds to an outdoor event for which weather information is to be provided; and the at least one memory includes further instructions that, when executed by the at least one processor, further cause the system to cause presentation of the weather information along with a representation of the calendar data.

16. The system of claim 12, wherein;

the user input requests an event to be added to an electronic calendar;

the skill component is capable of generating calendar data that causes the event to be added to the electronic calendar;

the implicit data represents that the event corresponds to an event requiring travel for which traffic information is to be provided; and the at least one memory includes further instructions that, when executed by the at least one processor, further cause the system to cause presentation of the traffic information along with a representation of the calendar data.

17. The system of claim 12, wherein the at least one memory includes further instructions that, when executed by the at least one processor, further cause the system to:

receive a second user input requesting performance of the first action, the second user input being associated with a user profile;

receive, from the skill component, a second request for second implicit information corresponding to the second user input; and in response to the second request, determine, using a personalized implicit information component associated with the user profile and a representation of the second user input, second implicit data that is different than the implicit data.

18. The system of claim 12, wherein the at least one memory includes further instructions that, when executed by the at least one processor, further cause the system to:

determine automatic speech recognition (ASR) data corresponding to the user input;

determine, using the ASR data, first data including an intent and an entity corresponding to the user input; and process the first data to determine the implicit data.

* * * * *